United States Patent
Zhang et al.

(10) Patent No.: US 11,949,614 B2
(45) Date of Patent: Apr. 2, 2024

(54) METHOD AND APPARATUS FOR DETERMINING QUASI-CO-LOCATION REFERENCE SIGNAL

(71) Applicant: ZTE CORPORATION, Shenzhen (CN)

(72) Inventors: Shujuan Zhang, Shenzhen (CN); Yu Ngok Li, Shenzhen (CN); Bo Gao, Shenzhen (CN); Zhaohua Lu, Shenzhen (CN); Chuangxin Jiang, Shenzhen (CN); Zhen He, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 507 days.

(21) Appl. No.: 17/293,417

(22) PCT Filed: Nov. 12, 2019

(86) PCT No.: PCT/CN2019/117599
§ 371 (c)(1),
(2) Date: May 12, 2021

(87) PCT Pub. No.: WO2020/098656
PCT Pub. Date: May 22, 2020

(65) Prior Publication Data
US 2022/0021495 A1    Jan. 20, 2022

(30) Foreign Application Priority Data

Nov. 12, 2018   (CN) .......................... 201811341635.2

(51) Int. Cl.
*H04L 5/00*     (2006.01)
*H04W 64/00*    (2009.01)
*H04W 72/20*    (2023.01)

(52) U.S. Cl.
CPC .......... *H04L 5/0048* (2013.01); *H04L 5/0053* (2013.01); *H04L 5/0094* (2013.01); *H04W 64/003* (2013.01); *H04W 72/20* (2023.01)

(58) Field of Classification Search
CPC ... H04L 5/0048; H04L 5/0053; H04L 5/0094; H04W 64/003; H04W 72/20; H04B 17/373
See application file for complete search history.

(56) References Cited

U.S. PATENT DOCUMENTS

2018/0219606 A1\*   8/2018   Ng ...................... H04L 25/0204
2018/0262313 A1    9/2018   Nam et al.
(Continued)

FOREIGN PATENT DOCUMENTS

CA    3057550 A1    9/2018
CN    104782067 A    7/2015
(Continued)

OTHER PUBLICATIONS

Chinese Search Report in Application No. 2022107940830, dated Aug. 14, 2023, 8 pages, including English translation.
(Continued)

*Primary Examiner* — Hardikkumar D Patel
(74) *Attorney, Agent, or Firm* — Morgan, Lewis & Bockius LLP

(57) ABSTRACT

Provided are a method and apparatus for determining a quasi-co-location reference signal. The method includes: determining a first transmission configuration indication list corresponding to a first control channel element, determining, in the first transmission configuration indication list, index information of transmission configuration indication activated for the first control channel element, and determining a quasi-co-location reference signal activated for the first control channel element according to the index infor-
(Continued)

mation and the first transmission configuration indication list.

20 Claims, 3 Drawing Sheets

(56) References Cited

U.S. PATENT DOCUMENTS

| | | | |
|---|---|---|---|
| 2018/0302889 A1 | 10/2018 | Guo et al. | |
| 2019/0150161 A1* | 5/2019 | Cheng | H04W 72/542 370/330 |
| 2020/0100277 A1* | 3/2020 | Khoshnevisan | H04W 72/1273 |
| 2020/0252951 A1* | 8/2020 | Frenne | H04W 72/535 |

FOREIGN PATENT DOCUMENTS

| | | |
|---|---|---|
| CN | 107888266 A | 4/2018 |
| CN | 108024339 A | 5/2018 |
| CN | 108111276 A | 6/2018 |
| CN | 108199819 A | 6/2018 |
| CN | 108206714 A | 6/2018 |
| WO | WO-2018143702 A1 | 8/2018 |

OTHER PUBLICATIONS

Chinese Office Action in Application No. 2022107940830, dated Aug. 30, 2023, 8 pages, including English translation.
Huawei; Hisilicon, "Coreset Configuration and Search Space Design", *3GPP TSG RAN WG1 Meeting #91, R1-1719387*, Dec. 1, 2017 (Dec. 1, 2017), entire document.
International Search Report for Application No. PCT/CN2019/117599, dated Feb. 14, 2020, 6 pages including English translation.
Chinese Search Report for Application No. 201811341635.2, dated Apr. 14, 2022, 5 pages including translation.
Indian Office Action for Application No. 202127026270, dated Mar. 22, 2022, 6 pages.
Zte, "Remaining issues on QCL", 3GPP TSG RAN WG1 Meeting #93, R1-1805836, Busan, Korea May 21-25, 2018, 7 pages.
Zte, "Details and evaluation results on beam indication", 3GPP TSG RAN WG1 Meeting #91, R1-1719538, Nov. 27-Dec. 1, 2017, Reno, NV, 14 pages, including English translation.
Nokia, "Feature lead summary on QCL", 3GPP TSG RAN WG1 Meeting #92bis, R1-1805660, Apr. 16-20, 2018, Sanya, People Republic of China, 24 pages.
Catt, "Corrections to NR PDCCH", 3GPP TSG RAN WG1 Meeting #94, R1-1808378, Aug. 20-24, 2018, Gothenburg, Sweden, 17 pages, including English translation.
Ericsson, "Feature lead summary for beam management—Thursday", 3GPP TSG RAN WG1 Meeting #9, R1-1809864, Aug. 20-24, 2018, Gothenburg, Sweden, 26 pages.
Zte, "Enhancements on multi-TRP/Panel transmission", 3GPP TSG RAN WG1 Meeting #94bis, R1-1810220, Oct. 8-12, 2018, Chengdu, China, 12 pages, including English translation.
Supplemental European Search Report in Application No. EP19883434 dated Sep. 14, 2022, 8 pages.
JP Office Action in Application No. 2021-524995, dated Aug. 15, 2022, 12 pages, including English translation.

* cited by examiner

METHOD AND APPARATUS FOR DETERMINING QUASI-CO-LOCATION REFERENCE SIGNAL

CROSS REFERENCE TO RELATED APPLICATIONS

This is a national stage application filed under 37 U.S.C. 371 based on International Patent Application No. PCT/CN2019/117599, filed Nov. 12, 2019, which claims priority to Chinese Patent Application No. 201811341635.2 filed with the CNIPA Nov. 12, 2018, the disclosure of which are incorporated herein by reference in their entireties.

TECHNICAL FIELD

The present disclosure relates to the field of communications, for example, a method and apparatus for determining a quasi-co-location reference signal.

BACKGROUND

The concept of control channel resource set (CORESET) is introduced into the New Radio (NR), and one CORESET is configured with information such as a frequency domain resource, quasi-co-location reference signal information, and a resource mapping mode of the control channel. When a terminal initially accesses a base station, the base station configures one CORESET which is called CORESET0, for the terminal through a system message, and the terminal performs at least one of the operations in CORESET0: sensing physical random access channel (PRACH) response information or listening to a common message.

The quasi-co-location reference signal of CORESET0 may be a single side band (SSB) selected by the terminal based on the PRACH. Since the SSB selected by the terminal is not suitable after the terminal enters a radio resource control (RRC) link and no quasi-co-location reference signal would be configured for CORESET0 in the related NR signaling architecture, in order to increase the flexibility of CORESET0 and even enable a proprietary control channel to be transmitted on the resources of CORESET0, the quasi-co-location reference signal needs to be configured for CORESET0.

SUMMARY

Embodiments of the present disclosure provide a method and apparatus for determining a quasi-co-location reference signal, which can configure a quasi-co-location reference signal for a control channel element. For example, the method and apparatus can configure a quasi-co-location reference signal for CORESET0, thereby increasing flexibility of CORESET0 and even enabling a proprietary control channel to be transmitted on the resources of CORESET0.

An embodiment of the present disclosure provides a method for determining a quasi-co-location reference signal. The method includes the steps described below.

A first transmission configuration indication list corresponding to a first control channel element is determined.

Index information of transmission configuration indication activated for the first control channel element in the first transmission configuration indication list is determined.

A quasi-co-location reference signal activated for the first control channel element is determined according to the index information and the first transmission configuration indication list.

An embodiment of the present disclosure provides an apparatus for determining a quasi-co-location reference signal. The apparatus includes a transmission configuration indication list determination module, a transmission configuration indication index information determination module, and a first quasi-co-location reference signal determination module.

A transmission configuration indication list determination module is configured to determine a first transmission configuration indication list corresponding to a first control channel element.

The transmission configuration indication index information determination module is configured to determine index information of transmission configuration indication activated for the first control channel element in the first transmission configuration indication list.

The first quasi-co-location reference signal determination module is configured to determine a quasi-co-location reference signal activated for the first control channel element according to the index information and the first transmission configuration indication list.

An embodiment of the present disclosure provides a device for determining a quasi-co-location reference signal. The device includes a processor and a computer-readable storage medium, where the computer-readable storage medium is configured to store instructions which, when executed by the processor, implement any of the methods for determining a quasi-co-location reference signal described above.

An embodiment of the present disclosure provides a computer-readable storage medium, which is configured to store a computer program which, when executed by a processor, implements steps of any of the methods for determining a quasi-co-location reference signal described above.

An embodiment of the present disclosure provides a method for determining a quasi-co-location reference signal. The method includes the step described below.

In response to satisfying a third predetermined condition, a quasi-co-location reference signal of a reference parameter is determined according to a quasi-co-location reference signal of a control channel element satisfying a fifth predetermined characteristic in a second time unit. The second time unit is latest to at least one of a channel or a signal corresponding to the reference signal and is in a set of first time units, and each of the first time units includes a control channel element satisfying a fourth predetermined characteristic.

An embodiment of the present disclosure provides an apparatus for determining a quasi-co-location reference signal. The apparatus includes a second quasi-co-location reference signal determination module.

The second quasi-co-location reference signal determination module is configured to determine a quasi-co-location reference signal of the reference parameter according to a quasi-co-location reference signal of a control channel element satisfying a fifth predetermined characteristic in a second time unit. The second time unit is latest to at least one of a channel or a signal corresponding to a reference signal and is in a set of first time units, and each of the first time units includes a control channel element satisfying a fourth predetermined characteristic.

An embodiment of the present disclosure provides a device for determining a quasi-co-location reference signal. The device includes a processor and a computer-readable storage medium, where the computer-readable storage medium is configured to store instructions which, when executed by the processor, implement any of the methods for determining a quasi-co-location reference signal described above.

An embodiment of the present disclosure provides a computer-readable storage medium, which is configured to store a computer program which, when executed by a processor, implements steps of any of the method for determining a quasi-co-location reference signal described above.

An embodiment of the present disclosure provides a method for transmitting a reference signal. The method includes the steps described below.

Reference signal information is determined according to at least one of signaling information or a first predetermined rule, where a port of the reference signal information satisfies a second predetermined rule.

At least one of a reference signal, a channel corresponding to the reference signal, or a signal corresponding to the reference signal is transmitted according to the reference signal information.

An embodiment of the present disclosure provides an apparatus for transmitting a reference signal. The apparatus includes a determination module and a second transmission module.

The determination module is configured to determine reference signal information according to at least one of signaling information or a first predetermined rule, where a port of the reference signal information satisfies a second predetermined rule.

The second transmission module is configured to transmit, according to the reference signal information, at least one of the reference signal, a channel corresponding to the reference signal, or a signal corresponding to the reference signal.

An embodiment of the present disclosure provides a device for transmitting a reference signal. The device includes a processor and a computer-readable storage medium, where the computer-readable storage medium is configured to store instructions which, when executed by the processor, implement any of the methods for transmitting a reference signal described above.

An embodiment of the present disclosure provides a computer-readable storage medium, which is configured to store a computer program which, when executed by a processor, implements steps of any of the method for transmitting a reference signal described above.

In the embodiments of the present disclosure, a first transmission configuration indication list corresponding to a first control channel element is determined, index information of transmission configuration indication activated for the first control channel element in the first transmission configuration indication list is determined, and a quasi-co-location reference signal activated for the first control channel element is determined according to the index information and the first transmission configuration indication list. In the embodiments of the present disclosure, a quasi-co-location reference signal can be configured for a control channel element through the first transmission configuration indication list and the index information in the first transmission configuration indication list. For example, a quasi-co-location reference signal can be configured for CORESET0, thereby increasing flexibility of CORESET0 and even enabling a proprietary control channel to be transmitted on the resources of CORESET0.

BRIEF DESCRIPTION OF DRAWINGS

The drawings are used to provide a further understanding of the technical solutions of the embodiments of the present disclosure, constitute a part of the specification, and explain the technical solutions of the embodiments of the present disclosure in conjunction with the embodiments of the present disclosure.

DETAILED DESCRIPTION

Figure 1:
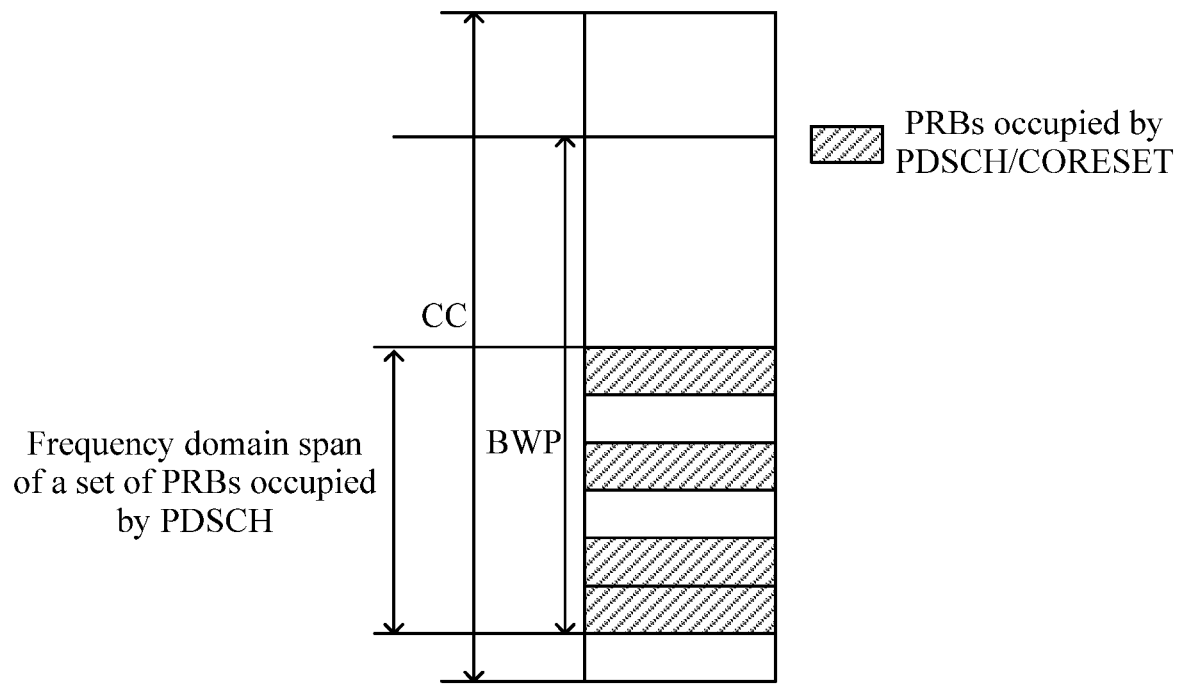
FIG. 1 is a schematic diagram of a frequency domain resource in which at least one of a channel or a signal is located according to an embodiment of the present disclosure.

Embodiments of the present disclosure will be described below in detail with reference to the drawings. It is to be noted that if not in collision, the embodiments described herein and the features thereof may be combined with each other.

The steps illustrated in the flowcharts among the drawings may be performed by, for example, a computer system capable of executing a set of computer-executable instructions. Moreover, although logical sequences are illustrated in the flowcharts, the illustrated or described steps may be performed in sequences different from those described herein in some cases.

In the embodiments described below, that two reference signals satisfy a quasi-co-location relationship indicates that the two reference signals satisfy a quasi-co-location relationship with respect to at least one quasi-co-location parameter, that is, the quasi-co-location parameter of one reference signal can be obtained according to the quasi-co-location parameter of the other reference signal. The quasi-co-location parameter includes at least one of a Doppler shift, a Doppler spread, an average delay, a delay spread, a Spatial Rx parameter, or an average gain.

In the embodiments described below, at least one of the characteristics described below is included.

One quasi-co-location parameter associates only one reference signal in one quasi-co-location reference signal set.

The difference set of the quasi-co-location parameter sets associated with different quasi-co-location reference signal sets is null.

One quasi-co-location reference signal set can only include at most two reference signals.

In the embodiments described below, the predetermined quasi-co-location parameter set belongs to a union set of the quasi-co-location parameter set associated with each reference signal in one quasi-co-location reference signal set.

In the embodiments described below, that the quasi-co-location reference signal of at least one of a channel or a signal means that the quasi-co-location reference signal and at least one of the channel or the signal satisfy a quasi-co-location relationship with respect to a type of quasi-co-location parameters. That the quasi-co-location reference signal of a channel element means that the channel element and the quasi-co-location reference signal satisfy a quasi-co-location relationship with respect to a type of quasi-co-location parameters. A quasi-co-location reference signal and at least one of a demodulation reference signal (DMRS) or a DMRS port satisfy a quasi-co-location relationship with respect to a type of quasi-co-location parameters.

In the embodiments described below, one piece of transmission configuration indication corresponds to one or more quasi-co-location reference signal sets. The transmission configuration indication may also be referred to as quasi-co-location reference signal indication information or other names.

In the embodiments described below, CORESET0 is a common control channel resource configured in a system message. A portion of the information of CORESET0 is configured in the system message and some information of CORESET0 may also be notified via user equipment (UE)-specific signaling. A first node (for example, a terminal) may acquire the control information transmitted by a second node (for example, a base station) through a common control channel transmitted in CORESET0 when the first node is in the idle state or before the radio resource control (RRC) link is established. Of course, the first node and the second node may interception the proprietary control channel in the COERSET0 after the RRC link is established.

In the embodiments described below, the control channel element is one of a control channel resource set (CORESET), a search space set, a search space, a candidate control channel, an occasion of the search space set, or an occasion of the search space.

In the embodiments described below, one frequency domain bandwidth corresponds to at least one of one component carrier (CC), one bandwidth part (BWP, that is, frequency domain bandwidth), or one continuous frequency domain bandwidth in the BWP.

That one frequency domain bandwidth belongs to another frequency domain bandwidth comprises that frequency domain resources of one frequency domain bandwidth belong to frequency domain resources of another frequency domain bandwidth. One frequency domain resource is a physical resource block (PRB) or an absolute frequency domain resource, where the absolute frequency domain resource includes a segment of frequency domain resources obtained based on a predetermined subcarrier spacing and a predetermined carrier reference point.

In the embodiments described below, that two pieces of information are associated with each other includes any of the following situations.

The value of one piece of information is obtained according to the value of the other piece of information.

The value range of one piece of information is obtained according to the value or the value range of the other piece of information.

Some combinations of values of the two pieces of information cannot occur simultaneously.

A transmission parameter of the element corresponding to one piece of information is obtained according to the other piece of information.

In the embodiments described below, the frequency domain resource in which at least one of the channel or the signal is located includes at least one of a CC in which at least one of the channel or the signal is located, a BWP in which at least one of the channel or the signal is located, a set of frequency domain resource blocks occupied by at least one of the channel or the signal, or the frequency domain span corresponding to the set of frequency domain resource blocks occupied by at least one of the channel or the signal.

For example, FIG. 1 shows a CC in which a physical downlink shared channel (PDSCH)/CORESET is located and the BWP in which the PDSCH/CORESET is located, and the dashed area in FIG. 1 shows the set of frequency domain resource blocks occupied by at least one of the channel or the signal. Further, as shown in FIG. 1, the frequency domain span is a set consisting of PRBs between the highest PRB index and the lowest PRB index in the set of frequency domain resource blocks occupied by at least one of the channel or the signal, where one frequency domain resource block is a PRB.

In the embodiments described below, the control channel for scheduling at least one of the channel or the signal corresponding to the reference signal does not include indication information of transmission configuration indication, which includes two cases described below.

One case is that a configuration of the control resource set indicates that a control channel of the control resource set does not include transmission configuration indication (TCI) information.

The other case is that the control information included in the control channel belongs to a predetermined format.

For example, that the physical downlink control channel (PDCCH) does not include the TCI information includes two cases described below.

One case is that the parameter tci-PresentInDCI is not configured in the CORESET in which the downlink control information (DCI) format1_1 is located, that is, the DCI format1_1 of the CORESET does not include the TCI information.

The other case is that the PDCCH includes the DCI format1_0 and the DCI format1_0 does not include the TCI information at any time.

In the above cases, the PDCCH is a PDCCH for scheduling a PDSCH/PDCCH.

Figure 2:
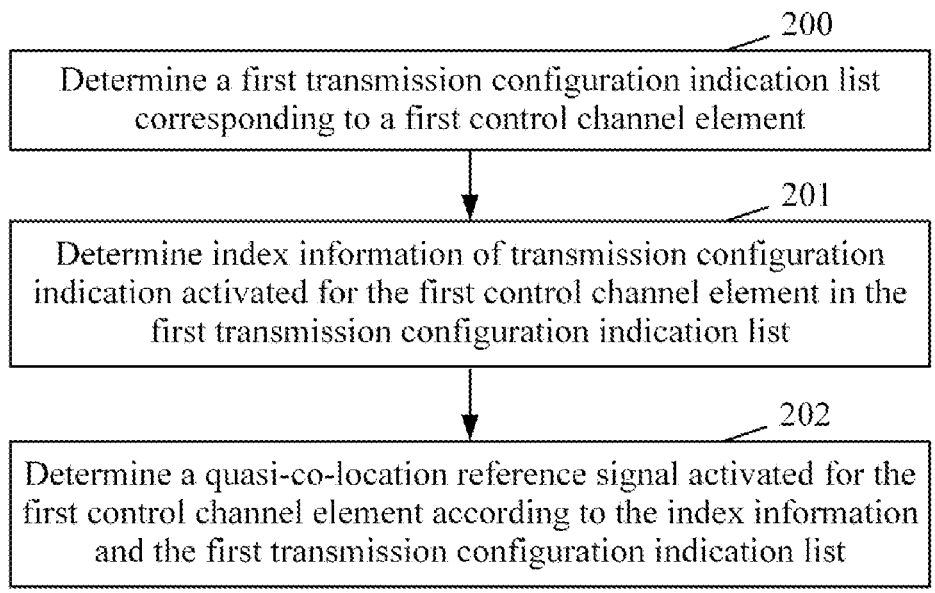
FIG. 2 is a flowchart of a method for determining a quasi-co-location reference signal according to an embodiment of the present disclosure.

With reference to FIG. 2, an embodiment of the present disclosure provides a method for determining a quasi-co-location reference signal. The method includes steps 200, 201, and 202 described below.

In step 200, a first transmission configuration indication list, which corresponds to a first control channel element, is determined.

In step 201, index information of transmission configuration indication, which is activated for the first control channel element in the first transmission configuration indication list, is determined.

In step 202, a quasi-co-location reference signal, which is activated for the first control channel element, is determined according to the index information and the first transmission configuration indication list.

In the embodiment of the present disclosure, a quasi-co-location reference signal can be configured for a control channel element through the first transmission configuration indication list and the index information in the first transmission configuration indication list. For example, a quasi-co-location reference signal can be configured for CORESET0, thereby increasing flexibility of CORESET0 and even enabling a proprietary control channel to be transmitted on the resources of CORESET0.

In another embodiment of the present disclosure, one piece of transmission configuration indication in the first transmission configuration indication list corresponds to at least one quasi-co-location reference signal set, which includes at least one of the following conditions.

One quasi-co-location parameter associates only one reference signal in one quasi-co-location reference signal set; the difference set of the quasi-co-location parameter sets associated with different quasi-co-location reference signal sets is null; or one quasi-co-location reference signal set can only include at most two reference signals.

For example, the first transmission configuration indication list may be a TCI state list in which one TCI state is one piece of transmission configuration indication and one TCI state corresponds to at least one quasi-co-location reference signal set.

In another embodiment of the present disclosure, the step in which a first transmission configuration indication list corresponding to a first control channel element is determined includes at least one of the following steps.

The first transmission configuration indication list is determined according to first control signaling.

The first transmission configuration indication list is determined according to determination of whether the first control channel element belongs to a predetermined control channel element set.

The first transmission configuration indication list is determined according to the number of BWPs configured other than an initial BWP. For example, when the number of BWPs configured other than the initial BWP is less than a predetermined threshold, the first transmission configuration indication list belongs to a transmission configuration indication list corresponding to channel elements in the initial BWP; when the number of BWPs configured other than the initial BWP is greater than or equal to the predetermined threshold, the first transmission configuration indication list belongs to a transmission configuration indication list corresponding to channel elements in a BWP, the BWP has the lowest BWP index in the set of BWPs other than the initial BWP.

The first transmission configuration indication list is determined according to determination of whether a channel element corresponding to a BWP satisfying a first predetermined characteristic configures a transmission configuration indication list.

The first transmission configuration indication list is determined according to determination of whether a transmission configuration indication list configured in a predetermined channel element satisfies a third predetermined characteristic.

In another embodiment of the present disclosure, the first control signaling satisfies one of the following conditions.

The first control signaling carries first transmission configuration indication list information.

Alternatively, the first control signaling carries BWP index information. The first transmission configuration indication list belongs to a second transmission configuration indication list configured in configuration indication of a first channel element in a BWP corresponding to the BWP index information.

Alternatively, the first control signaling carries at least one of BWP index information, channel element index information, or first control channel element index information. The first transmission configuration indication list belongs to a third transmission configuration indication list configured in configuration indication of a second channel element corresponding to both the BWP index information and the channel element index information, where the second channel element is a channel element corresponding to channel element index information in the BWP corresponding to the BWP index information.

In the embodiment of the present disclosure, that the first transmission configuration indication list belongs to the third transmission configuration indication list includes the following case.

A quasi-co-location reference signal corresponding to the transmission configuration indication belonging to the first transmission configuration indication list in the third transmission configuration indication list and a synchronization signal satisfy a quasi-co-location relationship with respect to a type of quasi-co-location parameters.

In another embodiment of the present disclosure, the first control channel element or the first channel element or the second channel element satisfies at least one of the following characteristics.

The first control channel element and a control channel element included in the first channel element are two different control channel elements.

The first control channel element and a control channel element included in the second channel element are two different control channel elements.

The first control channel element or the control channel element included in the first channel element or the control channel element included in the second channel element is a downlink control channel element.

The first control channel element or the control channel element included in the first channel element or the control channel element included in the second channel element includes at least one of a control channel resource set, a search space set, a search space, or a candidate control channel.

The frequency domain bandwidth corresponding to the BWP index information includes resources occupied by the first control channel element.

The first channel element includes at least one of a data channel element or a control channel element.

The frequency domain bandwidth in which the first channel element is located is different from the frequency domain bandwidth in which the first control channel element is located.

The second channel element includes at least one of: a data channel element or a control channel element.

The frequency domain bandwidth in which the second channel element is located is different from the frequency domain bandwidth in which the first control channel element is located.

In another embodiment of the present disclosure, the step in which the first transmission configuration indication list is determined according to the determination of whether the first control channel element belongs to the predetermined control channel element set includes at least one of the following steps.

In response to the first control channel element not belonging to the predetermined control channel element set, the first transmission configuration indication list is a transmission configuration indication list configured for the first control channel element in third control signaling, where the third control signaling carries a first control channel element index.

In response to the first control channel element belonging to the predetermined control channel element set, the first transmission configuration indication list belongs to a transmission configuration indication list configured for a third channel element in fourth control signaling, where the fourth control signaling does not carry the first control channel element index.

In the above steps, the predetermined control channel element set includes at least one of a control channel resource set 0 or a search space set 0.

In another embodiment of the present disclosure, the third channel element satisfies at least one of the following characteristics.

A BWP in which the third channel element is located satisfies the first predetermined characteristic at a predetermined time.

The third channel element satisfies a second predetermined characteristic at the predetermined time.

A transmission configuration indication list configured in the third channel element satisfies the third predetermined characteristic.

An intersection of a control channel element set included in the third channel element and the predetermined control channel element set is null.

The third channel element includes at least one of a data channel element or a control channel element.

In another embodiment of the present disclosure, the first predetermined characteristic includes at least one of the following characteristics.

The BWP is in an active state.
The BWP is the initial BWP.
The BWP is a default BWP.
The BWP and a BWP in which the first control channel element is located belong to the same CC.
The BWP includes a resource occupied by the first control channel element.
The BWP is a BWP having the lowest BWP index in a BWP set.
The BWP includes at least one predetermined type of channel elements, where the predetermined type of channel elements does not include the first control channel element.

In another embodiment of the present disclosure, the second predetermined characteristic includes at least one of the following characteristics.

The third channel element is a channel element transmitted in a time unit closest to the predetermined time.

The third channel element is a control channel element having a predetermined control channel element index in a set of a control channel element, other than the first control channel element, in the time unit closest to the predetermined time.

The third channel element is a control channel element having the predetermined control channel element index in a set of a control channel element, other than the first control channel element, in the BWP satisfying the first predetermined characteristic at the predetermined time.

The third channel element is a control channel element having the predetermined control channel element index in the set of the control channel element, other than the first control channel element, in the time unit closest to the predetermined time.

The third channel element is a control channel element having the predetermined control channel element index in the BWP satisfying the first predetermined characteristic at the predetermined time.

In the above characteristics, the predetermined control channel element index includes any one of the lowest control channel element index or the highest control channel element index.

In another embodiment of the present disclosure, the predetermined time includes at least one of a transmission time of the second control signaling or a time unit in which the transmission time is located; a start time at which transmission configuration indication carried in the second control signaling is capable of being used for receiving the first control channel element or a time unit in which the start time is located; the predetermined time which is associated with second control signaling information; or a monitoring time of the first control channel element or a time unit in which the monitoring time is located.

In another embodiment of the present disclosure, the second control signaling satisfies at least one of the following characteristics.

In response to satisfying a first predetermined condition, serving cell index information in the second control signaling and the first transmission configuration indication list information are jointly encoded.

In response to satisfying the first predetermined condition, the second control signaling carries the first transmission configuration indication list information.

In response to satisfying the first predetermined condition, the serving cell index information in the second control signaling is used for indicating the first transmission configuration indication list.

In the above characteristics, the second control signaling is medium access control-control element (MAC-CE) control signaling.

The first predetermined condition includes at least one of the first control channel element belongs to the predetermined control channel element set, the number of the serving cells is less than a first predetermined value, or the number of serving cells configured with the predetermined control channel element set is less than a second predetermined value.

The first transmission configuration indication list information includes at least one of the BWP index information, the first control channel element index information, the channel element index information, or transmission configuration indication list index information.

In another embodiment of the present disclosure, the third predetermined characteristic includes at least one of the following characteristics.

The number of elements included in the transmission configuration indication list is greater than a third predetermined value, where the transmission configuration indication is configured for the predetermined channel element or for the third channel element.

The number of pieces of first-type transmission configuration indication is greater than a fourth predetermined value, where the pieces of first-type transmission configuration indication are included in the transmission configuration indication list configured for the predetermined channel element or for the third channel element, and each quasi-co-location reference signal corresponding to the first-type transmission configuration indication and a synchronization signal satisfy a quasi-co-location relationship.

The number of pieces of second-type transmission configuration indication is greater than the fifth predetermined value, where the pieces of second-type transmission configuration indication are included in the transmission configuration indication list configured for the predetermined channel element or for the third channel element, and a quasi-co-location reference signal and a synchronization signal satisfy a quasi-co-location relationship, where the quasi-co-location corresponds to the second-type transmission configuration indication and is associated with a type of quasi-co-location parameters.

In another embodiment of the present disclosure, the step in which the first transmission configuration indication list is determined according to the number of BWPs configured other than the initial BWP includes at least one of the following steps.

In response to the number of the BWPs configured other than the initial BWP being less than a sixth predetermined value, the first transmission configuration indication list is determined to belong to a fourth transmission configuration indication list configured for configuration indication of a fourth channel element in the initial BWP.

In response to the number of the BWPs configured other than the initial BWP being greater than or equal to the sixth predetermined value, the first transmission configuration indication list is determined to belong to a fifth transmission configuration indication list configured for configuration indication of a fifth channel element in a BWP having a lowest BWP index, other than the initial BWP, in a BWP set.

In another embodiment of the present disclosure, the step in which the first transmission configuration indication list is determined according to the determination of whether the channel element corresponding to the BWP satisfying the first predetermined characteristic configures the transmission configuration indication list includes at least one of the following steps.

In response to the channel element, which corresponds to the BWP satisfying the first predetermined characteristic, not configuring with the transmission configuration indication list, the first transmission configuration indication list is determined to belong to a sixth transmission configuration indication list configured for configuration indication of a sixth channel element in a BWP other than the initial BWP.

In response to the channel element, which corresponds to the BWP satisfying the first predetermined characteristic, being configured with the transmission configuration indication list, the first transmission configuration indication list is determined to belong to a seventh transmission configuration indication list configured for configuration indication of a seventh channel element in the initial BWP.

In another embodiment of the present disclosure, the first transmission configuration indication list belongs to an $X^{th}$ transmission configuration indication list, where X is a value ranging from 2 to 7, which includes the following case.

A quasi-co-location reference signal and a synchronization signal satisfy a quasi-co-location relationship with respect to a type of quasi-co-location parameters, where the quasi-co-location reference signal corresponds to transmission configuration indication belonging to the first transmission configuration indication list in the $X^{th}$ transmission configuration indication list.

In another embodiment of the present disclosure, the type of quasi-co-location parameters satisfies at least one of the following characteristics.

The type of quasi-co-location parameters includes at least one of a Doppler shift, a Doppler spread, an average delay, a delay spread, or an average gain; or the type of quasi-co-location parameters does not include a spatial reception filtering parameter.

In another embodiment of the present disclosure, the first control channel element or an $i^{th}$ channel element satisfies at least one of the following characteristics, where i is a value ranging from 1 to 7. The first control channel element and a control channel element included in the $i^{th}$ channel element are two different control channel elements.

A control channel element, which includes in at least one of the first control channel element or the $i^{th}$ channel element, includes at least one of a control channel resource set, a search space set, a search space, a candidate control channel, or a downlink control channel.

The $i^{th}$ channel element includes at least one of a data channel element or a control channel element.

A frequency domain bandwidth in which the $i^{th}$ channel element is located is different from a frequency domain bandwidth in which the first control channel element is located.

A transmission configuration indication list configured in the $i^{th}$ channel element satisfies the third predetermined characteristic.

In another embodiment of the present disclosure, the third predetermined characteristic includes at least one of the following characteristics.

The number of elements is greater than the third predetermined value, where the elements are included in the transmission configuration indication list configured for the predetermined channel element or for the third channel element.

The number of pieces of first-type transmission configuration indication is greater than a fourth predetermined value, where the pieces of first-type transmission configuration indication are included in the transmission configuration indication list configured for the predetermined channel element or for the third channel element, and each quasi-co-location reference signal corresponding to the first-type transmission configuration indication and a synchronization signal satisfy a quasi-co-location relationship.

The number of pieces of second-type transmission configuration indication is greater than a fifth predetermined value, where the pieces of second-type transmission configuration indication are included in the transmission configuration indication list configured for the predetermined channel element or for the third channel element, and a quasi-co-location reference signal and a synchronization signal satisfy a quasi-co-location relationship, where a quasi-co-location reference signal corresponds to the second-type transmission configuration indication and is associated with a predetermined type of quasi-co-location parameters.

In another embodiment of the present disclosure, the step in which the index information of transmission configuration indication activated for the first control channel element in the first transmission configuration indication list is determined includes the following step.

The index information is determined according to second control signaling, where the second control signaling includes the index information.

In another embodiment of the present disclosure, the step in which the index information of transmission configuration indication activated for the first control channel element in the first transmission configuration indication list is determined includes at least one of the following steps.

In response to satisfying a second predetermined condition, the index information is determined according to the second control signaling, where the second control signaling includes the index information.

In response to not satisfying the second predetermined condition, a quasi-co-location reference signal of the first control channel element is a quasi-co-location reference signal corresponding to at least one transmission configuration indication index predetermined in the first transmission configuration indication list.

In the above steps, the second predetermined condition includes the following condition.

The number of pieces of transmission configuration indication included in the first transmission configuration indication list is greater than a seventh predetermined value.

In another embodiment of the present disclosure, the first control signaling or the second control signaling satisfies at least one of the following characteristics.

The first control signaling and the first control channel element are in an association relationship.

The first control signaling further carries the first control channel element information.

The second control signaling is MAC-CE control signaling.

The first control signaling and the second control signaling are the same control signaling.

The first control signaling is RRC signaling.

In another embodiment of the present disclosure, the step in which the quasi-co-location reference signal activated for the first control channel element is determined according to the index information and the first transmission configuration indication list includes the following steps.

The transmission configuration indication activated for the first control channel element is determined according to the index information and the first transmission configuration indication list, where the transmission configuration indication activated for the first control channel element is transmission configuration indication corresponding to index information in the first transmission configuration indication list.

The quasi-co-location reference signal activated for the first control channel element is determined according to the transmission configuration indication activated for the first control channel element, where the quasi-co-location reference signal activated for the first control channel element is a quasi-co-location reference signal in a quasi-co-location reference signal set corresponding to the transmission configuration indication activated for the first control channel element.

In another embodiment of the present disclosure, the quasi-co-location reference signal activated for the first control channel element corresponds to at least two synchronization signal blocks, and the method further includes the following step.

A monitoring occasion of the first control channel element is determined according to the at least two synchronization signal blocks corresponding to the quasi-co-location reference signal activated for the first control channel element.

In the above step, the first control channel element includes at least one of a control channel resource set 0 or a search space set 0.

One synchronization signal block corresponds to one synchronization signal (SS) broadcast channel block/physical broadcast channel (PBCH) block. For example, a 5 ms half frame includes at most 64 SSBs. Channels and/or signals in different SSBs do not satisfy a quasi-co-location relationship.

For example, when the CORESET is not the CORESET0 but, for example, the CORESET1, the RRC signaling configures a TCI state list (that is, in the first transmission configuration indication list, one TCI state is one piece of transmission configuration indication and corresponds to at least one quasi-co-location reference signal set) in the configuration indication of CORESET1. The MAC-CE signaling activates one TCI state for CORESET1 in the TCI state list, and a corresponding reference signal in the TCI state is a quasi-co-location reference signal of a demodulation reference signal (DMRS) of a physical downlink control channel (PDCCH) transmitted in CORESET1.

As shown in Table 1 below, TCI state1 corresponds to two quasi-co-location reference signal sets, which are quasi-co-location reference signal set 1 (channel state information-reference signal (CSI-RS) 1, CSI-RS2) and quasi-co-location reference signal set 2 (CSI-RS3, CSI-RS4). When the index information of the transmission configuration indication of one physical downlink shared channel (PDSCH)/CORESET is configured as TCI1, the quasi-co-location reference signal of the DMRS port group 1 of the PDSCH/CORESET is at least one of CSI-RS1 or CSI-RS2. The quasi-co-location parameters, including a Doppler shift, a Doppler spread, an average delay and a delay spread, of the DMRS port group 1 of the PDSCH/CORESET are acquired according to CSI-RS1, and the quasi-co-location parameter, including a Spatial Rx parameter, is acquired according to CSI-RS2. The quasi-co-location reference signal of the DMRS port group 2 of the PDSCH/CORESET is at least one of CSI-RS3 or CSI-RS4. The quasi-co-location parameters, including a Doppler shift, a Doppler spread, an average delay and a delay spread, of the DMRS port group 2 of the PDSCH/CORESET are acquired according to CSI-RS3, and the quasi-co-location parameter, including a Spatial Rx parameter, is acquired according to CSI-RS4. One quasi-co-location parameter can be associated with only one quasi-co-location reference signal in one quasi-co-location reference signal set.

TABLE 1

| TCI state ID | Quasi-co-location reference signal set | (quasi-co-location reference signal: quasi-co-location parameter) |
| --- | --- | --- |
| 1 | Set 1 | (CSI-RS1: Doppler shift, Doppler spread, average delay, delay spread) (CSI-RS2: Spatial Rx parameter) |
|   | Set 2 | (CSI-RS3: Doppler shift, Doppler spread, average delay, delay spread) (CSI-RS4: Spatial Rx parameter) |
| 2 | Set 1 | (CSI-RS5: Doppler shift, Doppler spread, average delay, delay spread) (CSI-RS5: Spatial Rx parameter) |

When the CORESET is CORESET0, the RRC signaling does not configure a TCI state list for CORESET0 in the configuration indication of CORESET0 so that CORESET0 does not have a corresponding TCI state list. At this point, if the MAC-CE signaling is intended to active a TCI state for CORESET0, the MAC-CE needs to determine a TCI state list in which the TCI state activated for the MAC-CE is located so that a first node may know the index of which TCI state list, in which the TCI state corresponding to the TCI state ID (that is, the index information of the transmission configuration indication) activated for the MAC-CE signaling is. Thus, there are the following schemes.

In Scheme 1, the TCI state list of CORESET0 is a TCI state list configured for the PDSCH in a BWP in the active state at a predetermined time.

In Scheme 2, the TCI state list of CORESET0 belongs to a TCI state list configured in a CORESET having the lowest CORESETID in the set of CORESET, other than CORESET0, in the BWP in the active state at the predetermined time.

In Scheme 3, the TCI state list of CORESET0 belongs to a TCI state list configured for the PDSCH in a default BWP at the predetermined time.

In Scheme 4, the TCI state list of CORESET0 belongs to a TCI state list configured in the CORESET having the lowest CORESETID in the set of CORESET, other than CORESET0, in the default BWP at the predetermined time.

In Scheme 5, the TCI state list of CORESET0 belongs to a TCI state list configured for the PDSCH in an Initial BWP at the predetermined time.

In Scheme 6, the TCI state list of CORESET0 belongs to a TCI state list configured in the CORESET having the lowest CORESETID in the set of CORESET, other than CORESET0, in the Initial BWP at the predetermined time.

In Scheme 7, the TCI state list of CORESET0 belongs to a TCI state list configured for the PDSCH in a BWP having the lowest BWPID in a predetermined BWP set at the predetermined time.

In Scheme 8, the TCI state list of CORESET0 belongs to a TCI state list configured in a CORESET having the lowest CORESETID in the set of CORESET, other than CORESET0, in the BWP having the lowest BWPID in the predetermined BWP set at the predetermined time.

In Schemes 7 and 8, the BWP in the predetermined BWP satisfies at least one of the following characteristics.

The BWP includes resources occupied by CORESET0. For example, the BWP includes frequency domain resources occupied by CORESET0.

The intersection between time resources of the BWP in the active state and monitoring time resources corresponding to a search space associated with CORESET0 is non-null.

In Scheme 9, the TCI state list of CORESET0 belongs to a TCI state list corresponding to a PDSCH that the first node needs to receive or buffer in a time unit (which, for example, may be a slot, and of course, which may also be other time units) closest to the predetermined time.

In Scheme 10, the TCI state list of CORESET0 belongs to a TCI state list corresponding to a CORESET having the lowest CORESETID, which the first node needs to receive or buffer or monitor in the set of CORESET, other than CORESET0, in the time unit (which, for example, may be a slot, and of course, which may also be other time units) closest to the predetermined time.

In Scheme 11, when the number of BWPs, other than the Initial BWP, configured for the first node is less than 4, the TCI state list of CORESET0 belongs to a TCI state list corresponding to a PDSCH in the Initial BWP. When the number of BWPs, other than the Initial BWP, configured for the first node is greater than or equal to 4, the TCI state list of CORESET0 belongs to a TCI state list corresponding to the PDSCH in a BWP having the lowest BWPID in a set of BWPs other than the Initial BWP.

In Scheme 12, when no TCI state list is configured for a PDSCH or a CORESET, other than COERSET0, in the Initial BWP, the TCI state list of CORESET0 belongs to a TCI state list configured by a PDSCH in a BWP other than the Initial BWP or a CORESET other than COERSET0, and when a TCI state list is configured for the PDSCH or the CORESET other than COERSET0 in the Initial BWP, the TCI state list of CORESET0 belongs to a TCI state list configured by the PDSCH or the CORESET other than COERSET0 in the Initial BWP.

In the above schemes, if more than one PDSCH-configuration (herein abbreviated as PDSCH-config) is included in one BWP, there is also a need to determine that the TCI state list of CORESET0 is the TCI state list included in which PDSCH-config of the BWP in the active state or Initial BWP or default BWP or BWP having the lowest BWPID. For example, it is determined that the TCI state list of CORESET0 is a TCI state list included in the PDSCH-config corresponding to the lowest PDSCH-config-ID.

In the above schemes, the predetermined time includes one of a time unit in which a PDSCH carrying the MAC-CE signaling (that is, the second control signaling) of the TCI state activated for the CORESET0 is located; a start time at which TCI state information carried in the MAC-CE signaling carrying the TCI state activated for the CORESET0 can be used in CORESET0, such as 3 ms after the successful reception of the MAC-CE; the predetermined time which is associated with the MAC-CE; or a monitoring time of a search space of CORESET0, for example, when CORESET0 search space 1 is monitored at time 1, the predetermined time is time 1, or when CORESET0 search space 1 is monitored at time 2, the predetermined time is time 2.

In the above schemes, the TCI state list corresponding to CORESET0 is obtained according to a convention rule. In another scheme of the present embodiment, the TCI state list corresponding to CORESET0 may also be notified through explicit signaling. In view of this, there may be schemes described below.

In Scheme A, the RRC signaling explicitly configures the TCI state list of CORESET0.

In Scheme B, the RRC signaling or the MAC-CE signaling notifies BWP index information corresponding to the TCI state list of CORESET0, where the TCI state list of CORESET0 belongs to a TCI state list configured in a PDSCH or a CORESET other than CORESET0 in a BWP corresponding to the BWP index information.

In Scheme C, the RRC signaling or the MAC-CE signaling notifies BWP index information and CORESET index information) which correspond to the TCI state list of CORESET0, where the TCI state list of CORESET0 belongs to a TCI state list configured in a CORESET corresponding to BWP index information and CORESET index information).

In Scheme D, the RRC signaling or the MAC-CE signaling notifies BWP index information and data channel (which is also referred to as PDSCH-config) index information) which correspond to the TCI state list of CORESET0, where the TCI state list of CORESET0 belongs to a TCI state list configured in a CORESET corresponding to BWP index information and data channel (which is also referred to as PDSCH-config) index information.

In an implementation, the above-mentioned MAC-CE signaling may be MAC-CE signaling for activating a TCI state of a CORESET.

In Scheme E, in the MAC-CE signaling carrying the TCI state activated for CORESET0, when the CORESETID indicator field indicates CORESET0, a serving cell ID and first information are jointly encoded, or at least one specific indicator field of the serving cell ID is used for indicating the first information. The first information includes at least one of a BWP index, a CORESET index, a PDSCH-config index, a TCI-state list index, or the TCI-state list of CORESET0 belonging to a TCI-state list corresponding to the first information. For example, when the CORESETID indicator field does not indicate CORESET0, the MAC-CE signaling for activating a TCI state for a CORESET does not carry the first information, and when the CORESETID indication field indicates CORESET0, the MAC-CE signaling for activating a TCI state for a CORESET carries the first information.

In the above embodiments, an index of configuration indication information of a quasi-co-location reference signal is a TCI state ID.

In the above-mentioned schemes, the TCI state list corresponding to the PDSCH or the CORESET having the lowest CORESETID satisfies at least one of the following characteristics.

The number of first-type TCI states in the TCI state list is greater than the fourth predetermined value, where a quasi-co-location reference signal corresponding to the first-type TCI state and a synchronization signal satisfy a quasi-co-location relationship.

The number of TCI states included in the TCI state list is greater than the third predetermined value.

The BWP and CORESET0 are located in the same CC, that is, both are in one serving cell, where the PDSCH or CORESET is located in the BWP.

In the above-mentioned schemes, the TCI state list of CORESET0 belongs to the TCI state list corresponding to the PDSCH or the CORESET having the lowest CORESETID. In an implementation, the TCI state list of CORESET0 is the above-mentioned TCI state list corresponding to the PDSCH or the CORESET having the lowest CORESETID. In another implementation, the TCI state list of CORESET0 is composed of the first-type TCI states in the above-mentioned TCI state list corresponding to the PDSCH or the CORESET having the lowest CORESETID.

Figure 3:
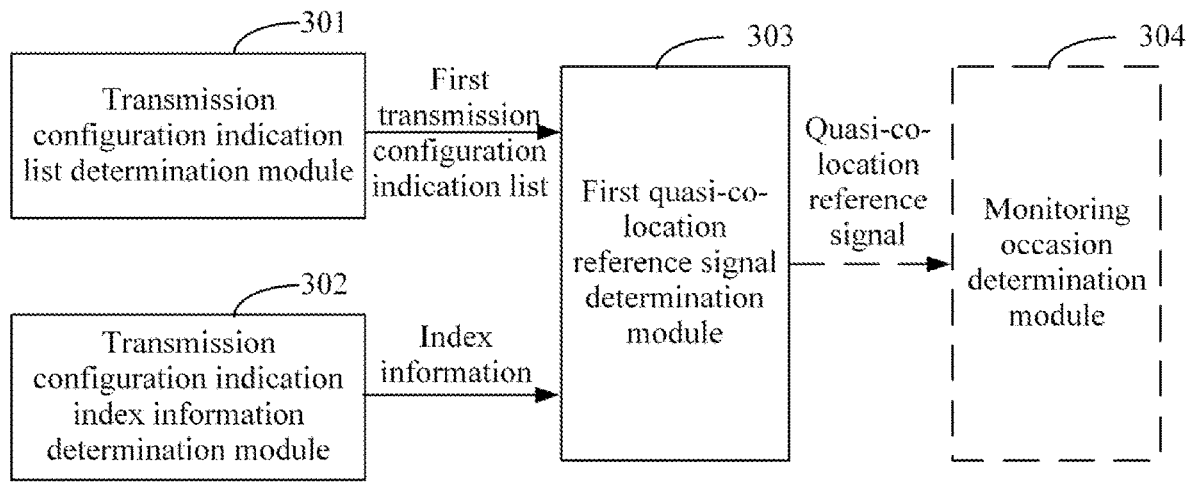
FIG. 3 is a structural diagram of an apparatus for determining a quasi-co-location reference signal according to another embodiment of the present disclosure.

With reference to FIG. 3, another embodiment of the present disclosure provides an apparatus for determining a quasi-co-location reference signal. The apparatus includes a transmission configuration indication list determination module 301, a transmission configuration indication index information determination module 302, and a first quasi-co-location reference signal determination module 303.

The transmission configuration indication list determination module 301 is configured to determine a first transmission configuration indication list corresponding to a first control channel element.

The transmission configuration indication index information determination module 302 is configured to determine index information of transmission configuration indication activated for the first control channel element in the first transmission configuration indication list.

The first quasi-co-location reference signal determination module 303 is configured to determine a quasi-co-location reference signal activated for the first control channel element according to the index information and the first transmission configuration indication list.

In another embodiment of the present disclosure, one piece of transmission configuration indication in the first transmission configuration indication list corresponds to at least one respective quasi-co-location reference signal set.

In another embodiment of the present disclosure, at least one of the characteristics described below is included.

One quasi-co-location parameter associates only one reference signal in one quasi-co-location reference signal set.

The difference set of the quasi-co-location parameter sets associated with different quasi-co-location reference signal sets is null.

One quasi-co-location reference signal set can only include at most two reference signals.

In another embodiment of the present disclosure, the transmission configuration indication list determination module 301 is configured to determine the first transmission configuration indication list corresponding to the first control channel element by using at least one of the following manners.

The first transmission configuration indication list is determined according to first control signaling.

The first transmission configuration indication list is determined according to determination of whether the first control channel element belongs to a predetermined control channel element set.

The first transmission configuration indication list is determined according to the number of BWPs configured other than an initial BWP.

The first transmission configuration indication list is determined according to determination of whether a transmission configuration indication list is configured for a channel element corresponding to a BWP, where the BWP satisfies a first predetermined characteristic configures.

The first transmission configuration indication list is determined according to determination result of whether a transmission configuration indication list configured for a predetermined channel element satisfies a third predetermined characteristic.

In response to satisfying a first predetermined condition, serving cell index information in the second control signaling and the first transmission configuration indication list information are jointly encoded.

In response to satisfying the first predetermined condition, the second control signaling carries the first transmission configuration indication list information.

In response to satisfying the first predetermined condition, the serving cell index information in the second control signaling is used for indicating the first transmission configuration indication list.

In the above characteristics, the first predetermined condition includes at least one of the first control channel element belongs to the predetermined control channel element set, the number of the serving cells is less than a first predetermined value, or the number of serving cells configured with the predetermined control channel element set is less than a second predetermined value.

In another embodiment of the present disclosure, the first control signaling carries first transmission configuration indication list information.

Alternatively, the first control signaling carries BWP index information, where the first transmission configuration indication list belongs to a second transmission configuration indication list configured in configuration indication of a first channel element in a BWP corresponding to the BWP index information.

Alternatively, the first control signaling carries at least one of BWP index information, channel element index information, or first control channel element index information, where the first transmission configuration indication list belongs to a third transmission configuration indication list configured in configuration indication of a second channel element corresponding to both the BWP index information and the channel element index information, where the second channel element is a channel element corresponding to channel element index information in the BWP corresponding to the BWP index information.

In another embodiment of the present disclosure, the first transmission configuration indication list belongs to the third transmission configuration indication list, which includes the following case.

A quasi-co-location reference signal and a synchronization signal satisfy a quasi-co-location relationship with respect to a type of quasi-co-location parameters, where the quasi-co-location reference signal corresponds to the transmission configuration indication, which belongs to the first transmission configuration indication list in the third transmission configuration indication list.

In another embodiment of the present disclosure, the first control channel element or the first channel element or the second channel element satisfies at least one of the following characteristics.

The first control channel element and a control channel element included in the first channel element are two different control channel elements.

The first control channel element and a control channel element included in the second channel element are two different control channel elements.

The first control channel element or the control channel element included in the first channel element or the control channel element included in the second channel element is a downlink control channel element.

The first control channel element or the control channel element included in the first channel element or the control channel element included in the second channel element includes at least one of a control channel resource set, a search space set, a search space, or a candidate control channel.

The frequency domain bandwidth corresponding to the BWP index information includes resources occupied by the first control channel element.

The first channel element includes at least one of a data channel element or a control channel element.

The frequency domain bandwidth in which the first channel element is located is different from the frequency domain bandwidth in which the first control channel element is located.

The second channel element includes at least one of a data channel element or a control channel element.

The frequency domain bandwidth in which the second channel element is located is different from the frequency domain bandwidth in which the first control channel element is located.

In another embodiment of the present disclosure, the transmission configuration indication list determination module 301 is configured to determine the first transmission configuration indication list according to the determination of whether the first control channel element belongs to the predetermined control channel element set by using at least one of the following manners.

In response to the first control channel element not belonging to the predetermined control channel element set, the first transmission configuration indication list is a transmission configuration indication list configured for the first control channel element in a third control signaling, where the third control signaling carries a first control channel element index.

In response to the first control channel element belonging to the predetermined control channel element set, the first transmission configuration indication list belongs to a transmission configuration indication list configured for a third channel element in fourth control signaling, where the fourth control signaling does not carry the first control channel element index.

In the above manners, the predetermined control channel element set includes at least one of a control channel resource set 0 or a search space set 0.

In another embodiment of the present disclosure, the third channel element satisfies at least one of the following characteristics.

A BWP in which the third channel element is located satisfies the first predetermined characteristic at a predetermined time.

The third channel element satisfies a second predetermined characteristic at the predetermined time.

A transmission configuration indication list configured in the third channel element satisfies the third predetermined characteristic.

An intersection of a control channel element set included in the third channel element and the predetermined control channel element set is null.

The third channel element includes at least one of a data channel element or a control channel element.

In another embodiment of the present disclosure, the first predetermined characteristic includes at least one of the following characteristics.

The BWP is in an active state.
The BWP is the initial BWP.
The BWP is a default BWP.
The BWP and a BWP in which the first control channel element is located belong to the same CC.
The BWP includes a resource occupied by the first control channel element.
The BWP is a BWP having the lowest BWP index in a BWP set.
The BWP includes at least one predetermined type of channel elements, where the predetermined type of channel elements does not include the first control channel element.

In another embodiment of the present disclosure, the second predetermined characteristic includes at least one of the following characteristics.

The third channel element is a channel element transmitted in a time unit closest to the predetermined time.

The third channel element is a control channel element having a predetermined control channel element index in a set of a control channel element, other than the first control channel element, in the time unit closest to the predetermined time.

The third channel element is a control channel element having the predetermined control channel element index in a set of a control channel element other than the first control channel element in the BWP satisfying the first predetermined characteristic at the predetermined time.

The third channel element is a control channel element having a predetermined control channel element index in a set of a control channel element, other than the first control channel element in the time unit closest to the predetermined time.

The third channel element is a control channel element having the predetermined control channel element index in the BWP satisfying the first predetermined characteristic at the predetermined time.

In the above characteristics, the predetermined control channel element index includes any one of the lowest control channel element index or the highest control channel element index.

In another embodiment of the present disclosure, the transmission configuration indication index information determination module 302 is configured to execute the following operation.

The index information is determined according to second control signaling, where the second control signaling includes the index information.

The predetermined time includes at least one of a transmission time of the second control signaling or a time unit in which the transmission time is located; a start time at which transmission configuration indication carried in the second control signaling can be used for receiving the first control channel element or a time unit in which the start time is located; the predetermined time which is associated with second control signaling information; or a monitoring time of the first control channel element or a time unit in which the monitoring time is located.

In another embodiment of the present disclosure, the second control signaling satisfies at least one of the following characteristics.

In response to satisfying a first predetermined condition, serving cell index information in the second control signaling and the first transmission configuration indication list information are jointly encoded.

In response to satisfying the first predetermined condition, the second control signaling carries the first transmission configuration indication list information.

In response to satisfying the first predetermined condition, the serving cell index information in the second control signaling is used for indicating the first transmission configuration indication list.

The second control signaling is a MAC-CE control signaling.

In the above characteristics, the first predetermined condition includes at least one of the first control channel element belongs to the predetermined control channel element set, the number of the serving cells is less than a first predetermined value, or the number of serving cells configured with the predetermined control channel element set is less than a second predetermined value.

The first transmission configuration indication list information includes at least one of the BWP index information, the first control channel element index information, the channel element index information, or transmission configuration indication list index information.

In another embodiment of the present disclosure, the third predetermined characteristic includes at least one of the following characteristics.

The number of elements included in the transmission configuration indication list is greater than the third predetermined value, where the transmission configuration indication list is configured for the predetermined channel element or for the third channel element.

The number of pieces of first-type transmission configuration indication is greater than a fourth predetermined value, where the pieces of first-type transmission configuration indication are comprised in the transmission configuration indication list configured for the predetermined channel element or for the third channel element, and each quasi-co-location reference signal corresponding to the first-type transmission configuration indication and a synchronization signal satisfy a quasi-co-location relationship.

The number of pieces of second-type transmission configuration indication is greater than a fifth predetermined value, where the pieces of second-type transmission configuration indication are comprised in the transmission configuration indication list configured for the predetermined channel element or for the third channel element, and a quasi-co-location reference signal and a synchronization signal satisfy a quasi-co-location relationship, where the quasi-co-location corresponds to the second-type transmission configuration indication and is associated with a predetermined type of quasi-co-location parameters.

In another embodiment of the present disclosure, the transmission configuration indication list determination module 301 is configured to determine the first transmission configuration indication list according to the number of BWPs configured other than the initial BWP by using at least one of the following manners.

In response to the number of the BWPs configured other than the initial BWP being less than a sixth predetermined value, the first transmission configuration indication list belongs to a fourth transmission configuration indication list configured for configuration indication of a fourth channel element in the initial BWP.

In response to the number of the BWPs configured other than the initial BWP being greater than or equal to the sixth predetermined value, the first transmission configuration indication list belongs to a fifth transmission configuration indication list configured for configuration indication of a fifth channel element in a BWP having a lowest BWP index, other than the initial BWP, in a BWP set.

In another embodiment of the present disclosure, the transmission configuration indication list determination module 301 is configured to determine the first transmission configuration indication list according to the determination of whether the channel element corresponding to the BWP satisfying the first predetermined characteristic configures the transmission configuration indication list by using at least one of the following manners.

In response to the channel element, which corresponds to the BWP satisfying the first predetermined characteristic, not be configured with the transmission configuration indication list, the first transmission configuration indication list belongs to a sixth transmission configuration indication list configured for configuration indication of a sixth channel element in a BWP other than the initial BWP.

In response to the channel element, which corresponds to the BWP satisfying the first predetermined characteristic, being configured with the transmission configuration indication list, the first transmission configuration indication list belongs to a seventh transmission configuration indication list configured for configuration indication of a seventh channel element in the initial BWP.

In another embodiment of the present disclosure, the first transmission configuration indication list belongs to an $X^{th}$ transmission configuration indication list, where X is a value ranging from 2 to 7, which includes the following case.

A quasi-co-location reference signal and a synchronization signal satisfy a quasi-co-location relationship with respect to a type of quasi-co-location parameters, where the quasi-co-location corresponds to transmission configuration indication belonging to the first transmission configuration indication list in the $X^{th}$ transmission configuration indication list.

In another embodiment of the present disclosure, the type of quasi-co-location parameters satisfies at least one of the following characteristics.

The type of quasi-co-location parameters includes at least one of a Doppler shift, a Doppler spread, an average delay, a delay spread, or an average gain.

The type of quasi-co-location parameters does not include a spatial reception filtering parameter.

In another embodiment of the present disclosure, the first control channel element or an $i^{th}$ channel element satisfies at least one of the following characteristics, where i is a value ranging from 1 to 7.

The first control channel element and a control channel element included in the $i^{th}$ channel element are two different control channel elements.

A control channel element included in at least one of the first control channel element or the $i^{th}$ channel element includes at least one of a control channel resource set, a search space set, a search space, a candidate control channel, or a downlink control channel.

The $i^{th}$ channel element includes at least one of a data channel element or a control channel element.

A frequency domain bandwidth in which the $i^{th}$ channel element is located is different from a frequency domain bandwidth in which the first control channel element is located.

A transmission configuration indication list configured in the $i^{th}$ channel element satisfies the third predetermined characteristic.

In another embodiment of the present disclosure, the third predetermined characteristic includes at least one of the following characteristics.

The number of elements is greater than the third predetermined value, where the elements are included in the transmission configuration indication list configured for the predetermined channel element or for the third channel element.

The number of pieces of first-type transmission configuration indication is greater than a fourth predetermined value, where the pieces of first-type transmission configuration indication are included in the transmission configuration indication list configured for the predetermined channel element or for the third channel element, and each quasi-co-location reference signal corresponding to the first-type transmission configuration indication and a synchronization signal satisfy a quasi-co-location relationship.

The number of pieces of second-type transmission configuration indication is greater than a fifth predetermined value, where the pieces of second-type transmission configuration indication are included in the transmission configuration indication list configured for the predetermined channel element or for the third channel element; and a quasi-co-location reference signal and a synchronization signal satisfy a quasi-co-location relationship, where the quasi-co-location reference signal corresponds to the second-type transmission configuration indication and is associated with a predetermined type of quasi-co-location parameters.

In another embodiment of the present disclosure, the transmission configuration indication index information determination module 302 is configured to determine the index information of the transmission configuration indication activated for the first control channel element in the first transmission configuration indication list by using at least one of the following manners.

In response to satisfying a second predetermined condition, the index information is determined according to the second control signaling, where the second control signaling includes the index information.

In response to not satisfying the second predetermined condition, a quasi-co-location reference signal of the first control channel element is a quasi-co-location reference signal corresponding to at least one transmission configuration indication index predetermined in the first transmission configuration indication list.

In the above manners, the second preset condition includes the following condition.

The number of pieces of transmission configuration indication included in the first transmission configuration indication list is greater than a seventh predetermined value.

In another embodiment of the present disclosure, the first control signaling or the second control signaling satisfies at least one of the following characteristics.

The first control signaling and the first control channel element are in an association relationship.

The first control signaling further carries the first control channel element information.

The second control signaling is MAC-CE control signaling.

The first control signaling and the second control signaling are the same control signaling.

The first control signaling is RRC signaling.

In another embodiment of the present disclosure, the first quasi-co-location reference signal determination module 303 is configured to execute the following operations.

The transmission configuration indication activated for the first control channel element is determined according to the index information and the first transmission configuration indication list.

The quasi-co-location reference signal activated for the first control channel element is determined according to the transmission configuration indication activated for the first control channel element.

In another embodiment of the present disclosure, the quasi-co-location reference signal activated for the first control channel element corresponds to at least two synchronization signal blocks, and the apparatus further includes a monitoring occasion determination module 304.

The monitoring occasion determination module 304 is configured to determine a monitoring occasion of the first control channel element according to the at least two synchronization signal blocks corresponding to the quasi-co-location reference signal activated for the first control channel element.

The first control channel element includes at least one of a control channel resource set 0 or a search space set 0.

The implementation process of the apparatus for determining a quasi-co-location reference signal is the same as the implementation process of the method for determining a quasi-co-location reference signal in the above-mentioned embodiments, and will not be repeated herein.

Another embodiment of the present disclosure provides a device for determining a quasi-co-location reference signal. The device includes a processor and a computer-readable storage medium, where the computer-readable storage medium is configured to store instructions which, when executed by the processor, implement any of the methods for determining a quasi-co-location reference signal described above.

Another embodiment of the present disclosure provides a computer-readable storage medium. The computer-readable storage medium stores a computer program which, when executed by a processor, implements steps of any of the methods for determining a quasi-co-location reference signal described above.

At present, in the standards, there is no limitation on the frequency domain resource in which a target reference signal is located and the frequency domain resource in which a target quasi-co-location reference signal is located, which results in the inaccurate acquisition of a type of quasi-co-location parameters of the target reference signal and the inaccurate reception of at least one of the channel or the signal corresponding to the target reference signal, thereby reducing the spectral efficiency. For the above-mentioned problems, the present disclosure provides the above-mentioned solutions, which can effectively improve the acquisition accuracy of a type of quasi-co-location parameters of the target reference signal and improve the spectral efficiency. There may be certain configurations for the reference signal information in the standards, and these configurations may prevent the system from working normally. For this problem, some solutions are provided herein to enable the system to function properly.

Figure 4:
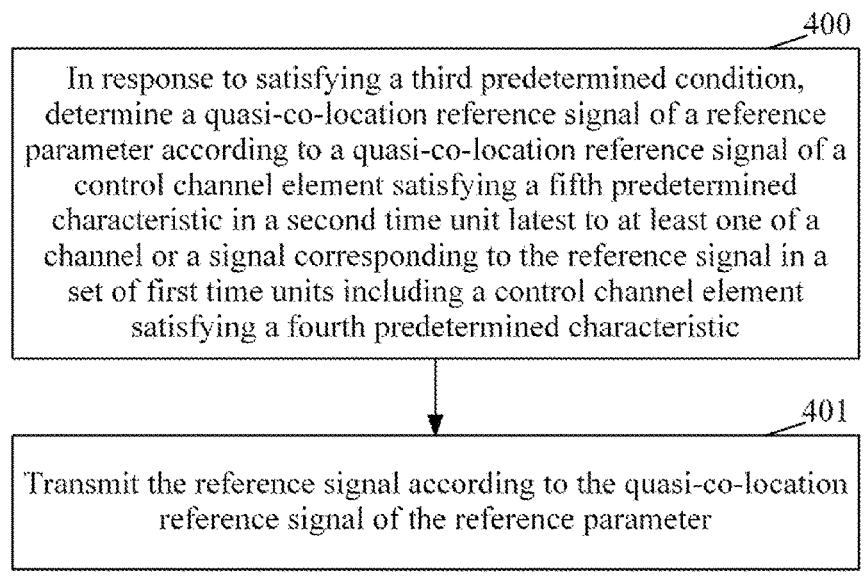
FIG. 4 is a flowchart of a method for determining a quasi-co-location reference signal according to another embodiment of the present disclosure.

With reference to FIG. 4, another embodiment of the present disclosure provides a method for determining a quasi-co-location reference signal. The method includes step 400 described below.

In step 400, in response to satisfying a third predetermined condition, a quasi-co-location reference signal of a reference parameter is determined according to a quasi-co-location reference signal of a control channel element satisfying a fifth predetermined characteristic in a second time unit, where the second time unit is latest to at least one of a channel or a signal corresponding to the reference signal in a set of first time units, and each of the first time units includes a control channel element satisfying a fourth predetermined characteristic.

In another embodiment of the present disclosure, the method further includes step 401 described below.

In step 401, the reference signal is transmitted according to the quasi-co-location reference signal of the reference parameter.

In another embodiment of the present disclosure, the fourth predetermined characteristic includes at least one of the following characteristics.

An intersection of the control channel element and a control channel element whose index is 0 is null, that is, the control channel element is not CORESET0.

In response to the first time unit satisfying a fourth predetermined condition, the control channel element includes the control channel element whose index is 0.

The control channel element and at least one of the channel or the signal corresponding to the reference signal are in the same frequency domain bandwidth.

The control channel element and a BWP in an active state in the first time unit satisfy a sixth predetermined characteristic.

A first frequency domain resource in which the control channel element is located and a second frequency domain resource corresponding to the BWP in the active state in the first time unit satisfy a fifth predetermined condition.

A third frequency domain resource in which a quasi-co-location reference signal, which is associated with a type of quasi-co-location parameters, of the control channel element is located and the second frequency domain resource corresponding to the BWP in the active state in the first time unit satisfy the fifth predetermined condition, where the second frequency domain resource corresponding to the BWP is a set of PRBs included in the BWP.

In another embodiment of the present disclosure, that the first time unit satisfies the fourth predetermined condition includes at least one of the following conditions.

The BWP in the active state in the first time unit is a predetermined BWP, where the predetermined BWP includes one of a BWP whose index is 0, a BWP whose index is 1, or a transmission configuration indication list corresponding to a control element whose index is 0 belongs to a transmission configuration indication list included in the predetermined BWP.

The BWP in the active state in the first time unit includes a frequency domain resource corresponding to an initial BWP.

The BWP in the active state in the first time unit and the control channel element whose index is 0 satisfy the sixth predetermined characteristic.

In another embodiment of the present disclosure, the control channel element and the BWP in the active state in the first time unit satisfy the sixth predetermined characteristic that includes at least one of the following characteristics.

Configuration indication of the BWP includes configuration indication of the control channel element.

The configuration indication of the BWP includes configuration indication of at least one search space set associated with the control channel element, that is, frequency domain resources of the search space are frequency domain resources occupied by the control channel element, and candidate control channels in the search space set are distributed among the frequency domain resources determined by the control channel element.

The BWP includes a frequency domain resource in which the control channel element is located.

The BWP includes a frequency domain resource corresponding to a first BWP, where configuration indication of the first BWP includes the configuration indication of the control channel element.

An intersection between a time resource of the BWP in the active state and a monitoring time resource of the control channel element is non-null, where a monitoring time of the control channel element is a union set of monitoring times of at least one search space set associated with the control channel element.

In another embodiment of the present disclosure, the control channel element satisfying the fifth predetermined characteristic includes a control channel element. The control channel element has the lowest control channel element index in a set composed of control channel elements, the control channel elements satisfy the fourth predetermined characteristic in a second time unit, and the second time unit is closest to at least one of the channel or the signal corresponding to the reference signal.

In another embodiment of the present disclosure, that at least one of the channel or the signal corresponding to the reference signal satisfies the third predetermined condition includes at least one of the following conditions.

A time interval between a control channel and at least one of the channel or the signal corresponding to the reference signal is less than a predetermined threshold, where the control channel is used for scheduling at least one of the channel or the signal corresponding to the reference signal.

A fourth frequency domain resource and a fifth frequency domain resource in which at least one of the channel or the signal corresponding to the reference signal is located do not satisfy the fifth predetermined condition, and the control channel for scheduling at least one of the channel or the signal corresponding to the reference signal does not include indication information of transmission configuration indication, where a quasi-co-location reference signal of the control channel is located in the fourth frequency domain resource and is associated with a type of quasi-co-location, and the control channel is used for scheduling at least one of the channel or the signal corresponding to the reference signal.

A sixth frequency domain resource in which the control channel for scheduling at least one of the channel or the signal corresponding to the reference signal is located and the fifth frequency domain resource in which at least one of the channel or the signal corresponding to the reference signal is located do not satisfy the fifth predetermined condition, and the control channel for scheduling at least one of the channel or the signal corresponding to the reference signal does not include the indication information of the transmission configuration indication.

A twelfth frequency domain resource and the fifth frequency domain resource in which at least one of the channel or the signal corresponding to the reference signal is located satisfy the fifth predetermined condition, where a quasi-co-location reference signal of the control channel is located in the twelfth frequency domain resource and is associated with a type of quasi-co-location parameters, and the control channel element satisfies the fifth predetermined characteristic.

A thirteenth frequency domain resource in which a second signal is located and the fifth frequency domain resource in which at least one of the channel or the signal corresponding to the reference signal is located satisfy the fifth predetermined condition, where the second signal and a quasi-colocation reference signal of the control channel element satisfy a quasi-co-location relationship with respect to a type of quasi-co-location parameters, and the control channel satisfies the fifth predetermined characteristic or is used for scheduling the reference signal.

A thirteen frequency domain resource in which the control channel element satisfying the fifth predetermined characteristic is located and the fifth frequency domain resource in which at least one of the channel or the signal corresponding to the reference signal is located satisfy the fifth predetermined condition.

A seventh frequency domain resource and the fifth frequency domain resource in which at least one of the channel or the signal corresponding to the reference signal is located do not satisfy the fifth predetermined condition, where a quasi-co-location reference signal is located in the seventh frequency domain resource and is associated with a type of quasi-co-location parameters in transmission configuration indication, and the transmission configuration indication is used for indicating the reference signal and in the control channel for scheduling the reference signal.

A quasi-co-location reference signal is received by the communication node, where the quasi-co-location reference signal is associated with a spatial reception filtering parameter which is included in at least one piece of transmission configuration indication information.

In another embodiment of the present disclosure, the predetermined threshold is obtained according to at least one of reported capability information; a subcarrier spacing corresponding to at least one of the channel or the signal corresponding to the reference signal; a subcarrier spacing corresponding to the reported capability information; the subcarrier spacing corresponding to the control channel for scheduling at least one of the channel or the signal corresponding to the reference signal; a subcarrier spacing corresponding to a control channel element satisfying a fifth predetermined characteristic; or a sub carrier spacing used for calculating the time interval.

In another embodiment of the present disclosure, the time interval is obtained according to at least one of a subcarrier spacing corresponding to the control channel for scheduling at least one of the channel or the signal corresponding to the reference signal; the subcarrier spacing corresponding to the control channel element satisfying the fifth predetermined characteristic; or the subcarrier spacing used for calculating the time interval.

In another embodiment of the present disclosure, at least one of the channel or the signal corresponding to the reference signal satisfies one of the following characteristics.

The fifth frequency domain resource in which at least one of the channel or the signal corresponding to the reference signal is located and an eighth frequency domain resource in which a quasi-co-location reference signal, which is associated with a type of quasi-co-location parameters, of the reference signal, is located satisfy a fifth predetermined condition.

The fifth frequency domain resource in which at least one of the channel or the signal corresponding to the reference signal is located and a ninth frequency domain resource in which a second signal is located satisfy the fifth predetermined condition, where the second signal and the reference signal satisfy a quasi-co-location relationship with respect to a type of quasi-co-location parameters.

In response to a frequency domain bandwidth in which at least one of the channel or the signal corresponding to the reference signal is located being different from a frequency domain bandwidth in which the quasi-co-location reference signal, which is associated with the type of quasi-co-location parameters, of the reference signal is located, the fifth frequency domain resource in which at least one of the channel or the signal corresponding to the reference signal is located and the eighth frequency domain resource in which the quasi-co-location reference signal, which is associated with the type of quasi-co-location parameters, of the reference signal is located satisfy the fifth predetermined condition.

In response to the frequency domain bandwidth in which at least one of the channel or the signal corresponding to the reference signal is located being different from a frequency domain bandwidth in which the second signal is located, the fifth frequency domain resource in which at least one of the channel or the signal corresponding to the reference signal is located and a tenth frequency domain resource in which the second signal is located satisfy the fifth predetermined condition, where the second signal and the quasi-co-location reference signal of the reference parameter satisfy a quasi-co-location relationship with respect to a type of quasi-co-location parameters.

In response to the frequency domain bandwidth in which at least one of the channel or the signal corresponding to the reference signal is located being different from the frequency domain bandwidth in which the quasi-co-location reference signal, which is associated with the type of quasi-co-location parameters, of the reference signal is located and the fifth frequency domain resource in which at least one of the channel or the signal corresponding to the reference signal is located and the eighth frequency domain resource in which the quasi-co-location reference signal, which is associated with the type of quasi-co-location parameters, of the reference signal is located not satisfying the fifth predetermined condition, the third predetermined condition is satisfied.

In response to the frequency domain bandwidth in which the at least one of the channel or the signal corresponding to the reference signal is located being different from the frequency domain bandwidth in which the second signal is located and the fifth frequency domain resource in which the at least one of the channel or the signal corresponding to the reference signal is located and the tenth frequency domain resource in which the second signal is located satisfying the fifth predetermined condition, the third predetermined condition is satisfied, where the second signal and the quasi-co-location reference signal of the reference parameter satisfy a quasi-co-location relationship with respect to a type of quasi-co-location parameters.

In another embodiment of the present disclosure, in response to at least one of the quasi-co-location reference signal of the reference parameter or the second signal being a tracking reference signal, a frequency domain span of the tracking reference signal is greater than or equal to a frequency domain span Y, where the frequency domain span Y is obtained in one of the following manners.

In response to a period of the tracking reference signal belonging to a first period set, Y is min (52 PRBs, a frequency domain span corresponding to at least one of the channel or the signal corresponding to the reference signal), where min denotes to calculate a minimum value.

In response to the period of the tracking reference signal not belonging to the first period set, Y is the frequency domain span corresponding to at least one of the channel or the signal corresponding to the reference signal.

In the above manners, the frequency domain span corresponding to the at least one of the channel or the signal corresponding to the reference signal includes at least one of a set of frequency domain resource blocks included in a BWP in which at least one of the channel or the signal corresponding to the reference signal is located; or a set of frequency domain resource blocks between the highest indexed frequency domain resource block and the highest indexed resource block in a set of frequency domain resource blocks occupied by at least one of the channel or the signal corresponding to the reference signal.

In another embodiment of the present disclosure, the first period set includes the following period: 10 milliseconds.

In another embodiment of the present disclosure, that two frequency domain resources satisfy the fifth predetermined condition includes at least one of the following conditions.

A difference set of the two frequency domain resources is null, that is, the two frequency domain resources are the same frequency domain resource. For example, when the above-mentioned frequency domain resource is a CC/BWP, the CC1/BWP1 corresponding to one frequency domain resource and the CC2/BWP2 corresponding to the other frequency domain resource are the same BWP. For another example, when the above-mentioned frequency domain resource is a frequency domain resource block set, a frequency domain resource block set corresponding to one frequency domain resource is the same as a frequency domain resource block set corresponding to the other frequency domain resource. For another example, when the above-mentioned frequency domain resource is a span corresponding to a frequency domain resource block set, the span corresponding to the frequency domain resource block set corresponding to one frequency domain resource is the same as the span corresponding to the frequency domain resource block set corresponding to the other frequency domain resource.

A difference between a frequency domain span included in one of the two frequency domain resources and a frequency domain span included in the other of the two frequency domain resources is less than a predetermined value.

One of the two frequency domain resources belongs to the other of the two frequency domain resources.

An intersection of the two frequency domain resources is non-null.

Subcarrier spacings of the two frequency domain resources are the same.

In another embodiment of the present disclosure, the type of quasi-co-location parameters satisfies at least one of the following characteristics.

The type of quasi-co-location parameters includes at least one of a Doppler shift, a Doppler spread, an average delay, a delay spread, or an average gain.

The type of quasi-co-location parameters does not include a spatial reception filtering parameter.

In another embodiment of the present disclosure, the frequency domain resource in which at least one of the channel, the signal, or the control channel element is located includes at least one of a CC in which at least one of the channel, the signal, or the control channel element is located; a BWP of the CC in which at least one of the channel, the signal, or the control channel element is located; a set of frequency domain resource blocks occupied by at least one of the channel, the signal, or the control channel element is located; or a frequency domain span corresponding to the set of frequency domain resource blocks occupied by at least one of the channel, the signal, or the control channel element is located.

In another embodiment of the present disclosure, the method further includes the step described below.

In response to no first time unit including the control channel element satisfying the fourth predetermined characteristic, scheduling information satisfying the third predetermined condition is not wanted to be received.

Embodiment One

In this embodiment, when PDSCH/aperiodic-channel state information-reference signal (AP-CSI-RS) satisfies the third predetermined condition, the quasi-co-location reference signal of the PDSCH/AP-CSI-RS is obtained according to a quasi-co-location reference signal set of a CORESET, where the CORESET satisfies a fifth predetermined characteristic and is in a second time unit latest to the PDSCH/AP-CSI-RS, the second time unit is in a set of first time units, and each first time unit includes a CORESET which satisfies a fourth predetermined characteristic.

The fourth predetermined characteristic includes at least one of the following characteristics.

Characteristic 1: an intersection of the CORESET and a CORESET whose index is 0 is null, that is, the CORESET is not CORESET0.

Characteristic 2: the CORESET and the channel and/or signal corresponding to the reference signal are in the same frequency domain bandwidth. For example, the CORESET is the same as at least one of the CC or the BWP in which at least one of the channel or the signal is located.

Characteristic 3: the CORESET and a BWP in an active state in the first time unit satisfy a sixth predetermined characteristic.

Characteristic 4: a first frequency domain resource in which the control channel element is located and a second frequency domain resource corresponding to the BWP in the active state in the first time unit satisfy a fifth predetermined condition.

Characteristic 5: a third frequency domain resource in which a quasi-co-location reference signal, which is associated with a type of quasi-co-location parameters, of the control channel element is located and the second frequency domain resource corresponding to the BWP in the active state in the first time unit satisfy the fifth predetermined condition, where the second frequency domain resource corresponding to the BWP is a set of PRBs included in the BWP.

The quasi-co-location reference signal of the control channel element is the quasi-co-location reference signal, which is associated with a type of quasi-co-location parameters, of the control channel element.

That the PDSCH/AP-CSI-RS satisfies the third predefined condition includes at least one of the following conditions.

Condition 1: a time interval between a PDCCH for scheduling the PDSCH/AP-CSI-RS and the PDSCH/AP-CSI-RS is less than a predetermined threshold.

Condition 2: a fourth frequency domain resource in which a quasi-co-location reference signal, which is associated with a type of quasi-co-location parameters, of the PDCCH for scheduling PDSCH/AP-CSI-RS is located and a fifth frequency domain resource in which the PDSCH/AP-CSI-RS is located do not satisfy the fifth predetermined condition, and the PDCCH does not include indication information of the quasi-co-location reference signal of the PDSCH/AP-CSI-RS. For example the PDCCH does not include TCI information.

Condition 3: a sixth frequency domain resource in which a CORESET, in which the PDCCH for scheduling PDSCH/

AP-CSI-RS is located, is located and the fifth frequency domain resource in which the PDSCH/AP-CSI-RS is located do not satisfy the fifth predetermined condition, and the PDCCH does not include the indication information of the quasi-co-location reference signal of the PDSCH/AP-CSI-RS. For example the PDCCH does not include TCI information.

Condition 4: a seventh frequency domain resource and the fifth frequency domain resource in which at least one of the channel or the signal corresponding to the reference signal is located do not satisfy the fifth predetermined condition, where a quasi-co-location reference signal of PDSCH/AP-CSI-RS indicated in a TCI of the PDCCH for scheduling the PDSCH/AP-CSI-RS is located in the seventh frequency domain resource, and the quasi-co location reference signal is associated with a type of quasi-co-location parameters.

The type of quasi-co-location parameters includes at least one of a Doppler shift, a Doppler spread, an average delay, a delay spread, or an average gain. Alternatively, the type of quasi-co-location parameters does not include a Spatial Rx parameter.

That the CORESET and the BWP in the active state in the first time unit satisfy the sixth predetermined characteristic includes at least one of the following characteristics.

The configuration indication of the BWP includes configuration indication of the CORESET.

The configuration indication of the BWP includes configuration indication of at least one search space set associated with the CORESET, that is, frequency domain resources of the search space are frequency domain resources occupied by the CORESET, and candidate control channels in the search space set are distributed among the frequency domain resources determined by the CORESET.

The BWP includes a frequency domain resource in which the CORESET is located.

The BWP includes a frequency domain resource corresponding to a first BWP, where the configuration indication of the first BWP includes the configuration indication of the CORESET.

An intersection between a time resource of the BWP in the active state and a monitoring time resource of the CORESET is non-null, where a monitoring time of the CORESET is a union set of monitoring times of at least one search space set associated with the CORESET.

That two frequency domain resources satisfy the fifth predetermined condition includes at least one of the following conditions.

A difference set of the two frequency domain resources is null.

A difference between a frequency domain span included in one of the two frequency domain resources and a frequency domain span included in the other of the two frequency domain resources is less than a predetermined value.

One of the two frequency domain resources belongs to the other of the two frequency domain resources.

An intersection of the two frequency domain resources is non-null.

Subcarrier spacings of the two frequency domain resources are the same.

When there is no CORESET satisfying the fourth predetermined characteristic, the communication node does not expect to receive a PDCCH for scheduling the PDSCH/AP-CSI-RS in which a time interval between the PDCCH and the PDSCH/AP-CSI-RS is less than the predetermined threshold. For example, when no CORESET is configured in the CC/BWP in which the PDSCH/AP-CSI-RS is located or no CORESET satisfying the fourth predetermined characteristic is configured, the time interval between the PDCCH and the PDSCH cannot be less than the predetermined threshold.

The predetermined threshold is obtained according to at least one of the following information.

The information is capability information reported by the communication node.

The information is a subcarrier spacing corresponding to at least one of the channel or the signal corresponding to the reference signal.

The information is proportional relationship between the subcarrier spacing corresponding to the capability information reported by the communication node and the subcarrier spacing corresponding to at least one of the channel or the signal. For example, a minimum duration that is reported by the terminal and is required for the terminal to use the TCI information indicated by the PDCCH for the reception of the PDSCH/AP-CSI-RS is 7 time domain symbols when the subcarrier spacing is 60 kHz and the minimum duration is 28 time domain symbols when the subcarrier spacing is 120 kHz. In this case, the predetermined threshold is 7 time domain symbols when the subcarrier spacing of the BWP in which the PDSCH/AP-CSI-RS is located is 60 kHz, and the predetermined threshold is 28 time domain symbols when the subcarrier spacing of the BWP in which the PDSCH/AP-CSI-RS is located is 120 kHz. That is to say, since the absolute durations corresponding to the number of time domain symbols corresponding to different subcarrier spacings are different in the communication node capability report, the predetermined threshold is 7 time domain symbols when the subcarrier spacing of the BWP in which the PDCCH is located is 60 kHz and the predetermined threshold is 28 time domain symbols when the subcarrier spacing of the BWP in which the PDCCH is located is 120 kHz, where the PDCCH is a PDCCH for scheduling the PDSCH, or the predetermined threshold is 7 time domain symbols when the subcarrier spacing of the BWP in which the CORESET satisfying the fifth predetermined characteristic is located is 60 kHz and the predetermined threshold is 28 time domain symbols when the subcarrier spacing of the BWP in which the CORESET satisfying the fifth predetermined characteristic is located is 120 kHz.

The information is a subcarrier spacing corresponding to the control channel for scheduling at least one of the channel or the signal corresponding to the reference signal.

The information is a subcarrier spacing corresponding to a control channel element satisfying the fifth predetermined characteristic.

The information is a subcarrier spacing used for calculating the time interval.

As shown in FIG. 3, the subcarrier spacing of the BWP in which the PDCCH is located is different from the subcarrier spacing of the BWP in which the PDSCH is located. For example, the subcarrier spacing of BWP1 in which the PDCCH is located is 60 kHz, the subcarrier spacing of BWP2 in which the PDSCH is located is 120 kHz, and two slots in BWP2 correspond to one slot in BWP1. The time interval between the PDCCH and the PDSCH is obtained in at least one of the following manners.

Figure 5:
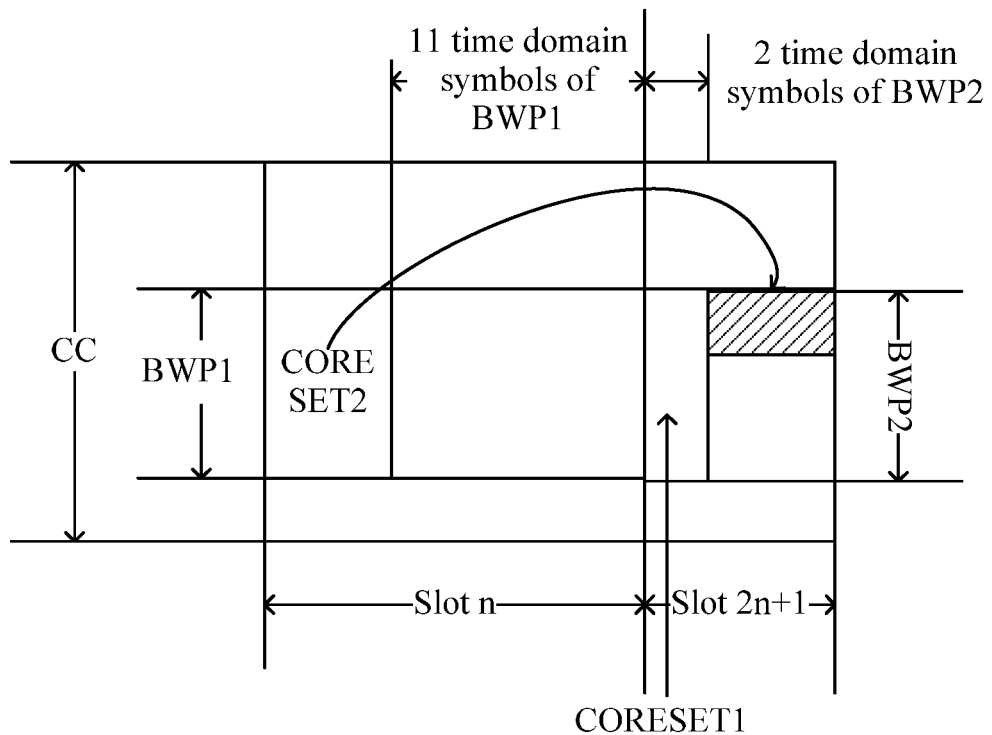
FIG. 5 is a schematic diagram of calculation of a time interval according to an embodiment of the present disclosure.
Figure 5:
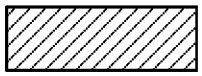

Manner 1: the number of time domain symbols corresponding to the time interval is obtained with the subcarrier spacing of the BWP in which the PDCCH is located as the reference. At this point, as shown in FIG. 5, the time interval between the PDCCH and the PDSCH is $$N_{GAP} = N_{PDCCH,BWP1} + \left\lfloor \frac{2^{\mu_{PDCCH}}}{2^{\mu_{PDSCH}}} N_{PDSCH,BWP2} \right\rfloor = 11 + \left\lfloor \frac{1}{2} * 2 \right\rfloor = 12,$$

where $N_{GAP}$ is the time interval.

Manner 2: acquisition parameters of the number of time domain symbols corresponding to the time interval include a ratio between the subcarrier spacing of the BWP of the PDCCH and the subcarrier spacing of the BWP of at least one of the PDSCH or AP-CSI-RS. As shown in FIG. 5, $$N_{GAP} = N_{PSCCH,BWP2} + \left\lfloor \frac{2^{\mu_{PDSCH}}}{2^{\mu_{PDCCH}}} N_{PDCCH,BWP1} \right\rfloor = 2 + \left\lfloor \frac{2}{1} * 11 \right\rfloor = 24.$$

Manner 3: the subcarrier spacing used for calculating the time interval is the minimum/maximum of the subcarrier spacing of BWP1 in which the PDCCH is located and the subcarrier spacing of BWP2 in which the PDSCH is located.

Manner 4: the time interval is the sum of the number of first time domain symbols obtained from (slot, subcarrier spacing BWP1 of the PDCCH) in which the PDCCH is located and the number of second time domain symbols obtained from (slot, subcarrier spacing BWP2 of the PDSCH) in which the PDSCH is located. At this point, as shown in FIG. 5, the time interval is $N_{GAP} = N_{PDSCH,BWP2} + N_{PDCCH,BWP1} = 2 + 11 = 13$.

In the above-mentioned manners, $N_{PDCCH,BWP1}$ denotes, between the PDCCH and the PDSCH/AP-CSI-RS, the number of symbols included in BWP1 in which the PDCCH is located with reference to the subcarrier spacing of BWP1, and $N_{PDSCH,BWP2}$ denotes, between the PDCCH and the PDSCH/AP-CSI-RS, the number of symbols included in BWP2 in which the PDSCH/AP-CSI-RS is located with reference to the subcarrier spacing of BWP2.

In Manners 1 to 3 for obtaining the time interval, the predetermined threshold obtains capability information that is reported by the communication node and corresponds to the subcarrier interval according to the subcarrier interval used by the time interval. For example, when the subcarrier interval used by the time interval to calculate the number of time domain symbols is 60 kHz, the predetermined threshold is 7 time domain symbols, and when the subcarrier interval used by the time interval to calculate the number of time domain symbols is 120 kHz, the predetermined threshold is 28 time domain symbols.

When the above-mentioned subcarrier spacing of the BWP in which the PDCCH is located and the subcarrier spacing of the BWP in which the PDSCH is located do not belong to {60 kHz, 120 kHz}, the predetermined threshold is calculated by one of {60 kHz, 120 kHz}, and the time interval is obtained according to the subcarrier spacing used by the predetermined threshold. For example, both the subcarrier spacing of the BWP in which the PDCCH is located and the subcarrier spacing of the BWP in which the PDSCH is located are 15 kHz, and the predetermined threshold uses the predetermined threshold corresponding to the 60 kHz in the communication node capability report, that is, the predetermined threshold is 7 time domain symbols. If the subcarrier spacing between the PDCCH and the PDSCH is 10 time domain symbols of 15 kHz, the number of time domain symbols which is converted into the subcarrier spacing of 60 kHz is $$N'_{GAP} = \left\lfloor \frac{2^{\mu'_{N_{GAP}}}}{2^{\mu_{N_{GAP}}}} N_{GAP} \right\rfloor = \left\lfloor \frac{2^2}{2^0} * 10 \right\rfloor = 40.$$

Embodiment Two

In this embodiment, when the PDCCH satisfies the sixth predetermined condition, the time interval between the PDCCH and the PDSCH/AP-CSI-RS cannot be greater than or equal to the predetermined threshold, that is, at this point, the time interval between the PDCCH and the PDSCH/AP-CSI-RS can only be less than the predetermined threshold, or when the PDCCH satisfies the fourth predetermined condition, the communication node does not expect to receive the scheduling in which the time interval between the PDCCH and the PDSCH/AP-CSI-RS is greater than or equal to the predetermined threshold, or when the time interval between the PDCCH and the PDSCH/AP-CSI-RS is greater than the predetermined threshold, the PDCCH cannot satisfy the sixth predetermined condition, where the PDCCH is a PDSCH for scheduling the PDSCH/AP-CSI-RS.

The sixth predetermined condition includes the condition that the PDCCH does not include quasi-co-location reference signal indication information (such as TCI information) of the PDSCH/AP-CSI-RS and at least one of the following conditions.

The fourth frequency domain resource in which a quasi-co-location reference signal, which is associated with a type of quasi-co-location parameters, of the PDCCH is located and the fifth frequency domain resource in which the PDSCH/AP-CSI-RS is located do not satisfy the fifth predetermined condition.

The sixth frequency domain resource in which a CORE-SET, in which the PDCCH is located, is located and the fifth frequency domain resource in which the PDSCH/AP-CSI-RS is located do not satisfy the fifth predetermined condition.

None of transmission configuration indication information includes the quasi-co-location reference signal associated with the spatial reception filtering parameter.

None of transmission configuration indication information in one frequency domain bandwidth or one frequency domain bandwidth group includes the quasi-co-location reference signal associated with the spatial reception filtering parameter is received.

The type of quasi-co-location parameters includes at least one of a Doppler shift, a Doppler spread, an average delay, a delay spread, or an average gain.

Alternatively, the type of quasi-co-location parameters does not include a Spatial Rx parameter.

When the time interval between the PDCCH and the PDSCH/AP-CSI-RS is greater than the predetermined threshold and the PDCCH does not include quasi-co-location reference signal indication information (such as TCI information) of the PDSCH/AP-CSI-RS, at least one of the following conditions is required to be satisfied.

The first frequency domain resource in which the quasi-co-location reference signal, which is associated with a type of quasi-co-location parameters, of the PDCCH is located and the second frequency domain resource in which the PDSCH/AP-CSI-RS is located satisfy the fifth predetermined condition.

The first frequency domain resource in which the CORESET, in which the PDCCH is located, is located and the second frequency domain resource in which the PDSCH/AP-CSI-RS is located satisfy the fifth predetermined condition.

None of transmission configuration indication information includes the quasi-co-location reference signal associated with the spatial reception filtering parameter.

None of transmission configuration indication information in one frequency domain bandwidth or one frequency domain bandwidth group includes the quasi-co-location reference signal associated with the spatial reception filtering parameter is received.

Two frequency domain resources satisfy the fifth predetermined condition that includes at least one of the following conditions.

A difference set of the two frequency domain resources is null, that is, the two frequency domain resources are the same frequency domain resource. For example, when the above-mentioned frequency domain resource is a CC/BWP, the CC1/BWP1 corresponding to one frequency domain resource and the CC2/BWP2 corresponding to the other frequency domain resource are the same BWP. For another example, when the above-mentioned frequency domain resource is a frequency domain resource block set, a frequency domain resource block set corresponding to one frequency domain resource is the same as a frequency domain resource block set corresponding to the other frequency domain resource. For another example, when the above-mentioned frequency domain resource is a span corresponding to a frequency domain resource block set, the span corresponding to the frequency domain resource block set corresponding to one frequency domain resource is the same as the span corresponding to the frequency domain resource block set corresponding to the other frequency domain resource.

A difference between a frequency domain span included in one of the two frequency domain resources and a frequency domain span included in the other of the two frequency domain resources is less than a predetermined value.

One of the two frequency domain resources belongs to the other of the two frequency domain resources.

An intersection of the two frequency domain resources is non-null.

Subcarrier spacings of the two frequency domain resources are the same.

Embodiment Three

In this embodiment, at least one of the following characteristics is included.

The fifth frequency domain resource in which at least one of the channel or the signal corresponding to the reference signal is located and the eighth frequency domain resource in which the quasi-co-location reference signal, which is associated with a type of quasi-co-location parameters, of the reference signal is located satisfy the fifth predetermined condition.

The fifth frequency domain resource in which at least one of the channel or the signal corresponding to the reference signal is located and the ninth frequency domain resource in which a second signal is located satisfy the fifth predetermined condition, where the second signal and the reference signal satisfy a quasi-co-location relationship with respect to a type of quasi-co-location parameters.

When the frequency domain bandwidth in which at least one of the channel or the signal corresponding to the reference signal is located is different from the frequency domain bandwidth in which the quasi-co-location reference signal, which is associated with the type of quasi-co-location parameters, of the reference signal is located, the fifth frequency domain resource in which at least one of the channel or the signal corresponding to the reference signal is located and the eighth frequency domain resource in which the quasi-co-location reference signal, which is associated with the type of quasi-co-location parameters, of the reference signal is located satisfy the fifth predetermined condition, where the frequency domain bandwidth includes at least one of a CC or a BWP.

When the frequency domain bandwidth in which at least one of the channel or the signal corresponding to the reference signal is located is different from the frequency domain bandwidth in which the second signal is located, the fifth frequency domain resource in which at least one of the channel or the signal corresponding to the reference signal is located and the ninth frequency domain resource in which the second signal is located satisfy the fifth predetermined condition, where the second signal and the quasi-co-location reference signal of the reference parameter satisfy a quasi-co-location relationship with respect to a type of quasi-co-location parameters.

The reference signal and the quasi-co-location reference signal, which is associated with a type of quasi-co-location parameters, of the reference signal satisfy a quasi-co-location relationship with respect to a predetermined type of quasi-co-location parameters.

The second signal and the quasi-co-location reference signal, which is associated with a type of quasi-co-location parameters, of the reference signal satisfy a quasi-co-location relationship with respect to a predetermined type of quasi-co-location parameters.

The predetermined type of quasi-co-location parameters satisfies at least one of the predetermined type of quasi-co-location parameters includes at least one of a Doppler shift, a Doppler spread, an average delay, or a delay spread; or the predetermined type of quasi-co-location parameters does not include a Spatial Rx parameter.

The quasi-co-location reference signal of the reference signal includes at least one of: a demodulation reference signal, a measurement reference signal, a phase tracking reference signal (PTRS), a measurement reference signal for tracking (CSI-RS for Tracking, TRS), or a channel corresponding to the demodulation reference signal.

At least one of the quasi-co-location reference signal or the second signal includes at least one of: a measurement reference signal, a TRS, or a synchronization signal.

Two frequency domain resources satisfy the fifth predetermined condition that includes at least one of the following conditions.

A difference set of the two frequency domain resources is null, that is, the two frequency domain resources are the same frequency domain resource. For example, when the above-mentioned frequency domain resource is a CC/BWP, the CC1/BWP1 corresponding to one frequency domain resource and the CC2/BWP2 corresponding to the other frequency domain resource are the same BWP. For another example, when the above-mentioned frequency domain resource is a frequency domain resource block set, a frequency domain resource block set corresponding to one frequency domain resource is the same as a frequency domain resource block set corresponding to the other frequency domain resource. For another example, when the above-mentioned frequency domain resource is a span corresponding to a frequency domain resource block set, the span corresponding to the frequency domain resource block set corresponding to one frequency domain resource is the same as the span corresponding to the frequency domain resource block set corresponding to the other frequency domain resource.

A difference between a frequency domain span included in one of the two frequency domain resources and a frequency domain span included in the other of the two frequency domain resources is less than a predetermined value.

One of the two frequency domain resources belongs to the other of the two frequency domain resources.

An intersection of the two frequency domain resources is non-null.

Subcarrier spacings of the two frequency domain resources are the same.

In particular, for example, when the quasi-co-location reference signal of the reference signal is a TRS or when the second signal is a TRS, the number of PRBs occupied by the TRS is obtained in at least one of the following manners.

When the period of the TRS is $2^u \times 10$ slots, the number of PRBs occupied by the TRS needs to satisfy: min (52, N).

When the period of the TRS is not $2^u \times 10$ slots, the number of PRBs occupied by the TRS is N.

In the above manners, N is the number of PRBs included in the BWP in which the reference signal is located or the number $N_{RB}^{BWP1}$ of PRBs included in BWP1, where BWP1 includes the frequency domain resource in which the reference signal is located, and the parameter u is a subcarrier spacing parameter of the CSI-RS, that is, the subcarrier spacing of the CSI-RS is $2^u \times 15$ kHz.

When the quasi-co-location reference signal of the reference signal is a TRS or when the second signal is a TRS, the number of PRBs occupied by the TRS needs to satisfy the following characteristics.

When the period of the TRS is not $2^u \times 10$ slots, the number of PRBs occupied by the TRS is not less than min(52, N).

When the period of the TRS is not $2^u \times 10$ slots, the number of PRBs occupied by the TRS is not less than N.

In the above characteristics, N is the number of PRBs included in the BWP in which the target signal is located or the number $N_{RB}^{BWP1}$ of PRBs included in BWP1, where BWP1 includes the frequency domain resource in which the target signal is located, and the parameter u is a subcarrier spacing parameter of the CSI-RS, that is, the subcarrier spacing of the CSI-RS is $2^u \times 15$ kHz.

Embodiment Four

In this embodiment, the terminal does not expect to receive the following configuration indication: the time interval between the PDCCH and the PDSCH/AP-CSI-RS is less than the predetermined threshold, and the frequency domain bandwidth index in which the PDCCH is located is different from the frequency domain bandwidth index in which the PDSCH/AP-CSI-RS is located. The above-mentioned frequency domain bandwidth is at least one of a CC or a BWP, and the PDCCH is a PDCCH for scheduling the PDSCH/AP-CSI-RS.

That is, when the frequency domain bandwidth index in which the PDCCH is located is different from the frequency domain bandwidth index in which the PDSCH is located, the time interval between the PDCCH and the PDSCH/AP-CSI-RS is greater than or equal to the predetermined threshold, that is, when the BWP/CC is switched, the time interval between the PDCCH and the PDSCH/AP-CSI-RS cannot be less than the predetermined threshold.

Embodiment Five

In this embodiment, when none of the TCI configuration indication received by the terminal includes the quasi-co-location reference signal associated with the type-D quasi-co-location parameter and the indication of the PDCCH includes the TCI indication information, the TCI information of the PDSCH/AP-CSI-RS is obtained according to the information indicated by the DCI, regardless of the relationship between the time interval between the PDCCH and the PDSCH and the predetermined threshold. For example, whether the time interval between the PDCCH and the PDSCH is less than or equal to the predetermined threshold or the time interval between the PDCCH and the PDSCH is greater than or equal to the predetermined threshold, the TCI information of the PDSCH/AP-CSI-RS is obtained according to the information indicated by the DCI.

When none of the TCI configuration indication received by the terminal includes the quasi-co-location reference signal associated with the type-D quasi-co-location parameter and the indication of the PDCCH does not include the TCI indication information, the TCI information of the PDSCH/AP-CSI-RS is obtained in one of the following manners, regardless of the relationship between the time interval between the PDCCH and the PDSCH and the predetermined threshold.

Manner 1: the TCI information of the PDSCH/AP-CSI-RS is obtained according to the quasi-co-location reference signal of the PDCCH.

Manner 2: the TCI information of the PDSCH/AP-CSI-RS is obtained according to the SSB selected by the terminal at the initial access.

Whether to use Manner 1 or Manner 2 may be explicitly indicated by the base station.

Alternatively, whether to use Manner 1 or Manner 2 is determined according to frequency domain span information of the frequency domain resource in which the PDSCH/AP-CSI-RS is located. For example, if the frequency domain span is small, Manner 2 is used; while if the frequency domain span is large, Manner 1 is used.

Alternatively, one of Manner 1 or Manner 2 is used according to the convention.

Alternatively, whether to use Manner 1 or Manner 2 is determined according to the period of the SSB. When the period of the SSB is less than a predetermined value, the TCI information is obtained according to Manner 2, otherwise the TCI information is obtained according to Manner 1.

Alternatively, whether to use Manner 1 or Manner 2 is determined depending on whether the RRC configures the TCI information for the PDCCH/PDSCH.

The type-D quasi-co-location parameter is a Spatial Rx parameter, the PDCCH is a quasi-co-location reference signal for scheduling the PDCCH/AP-CSI-RS, and the TCI information of the PDSCH/AP-CSI-RS is quasi-co-location reference signal information of the PDSCH/AP-CSI-RS.

Embodiment Six

In this embodiment, when none of the TCI configuration indication received by the terminal for one frequency domain bandwidth/frequency domain bandwidth group includes the quasi-co-location reference signal associated with the type-D quasi-co-location parameter and the indication of the PDCCH includes the TCI indication information, the TCI information of the PDSCH/AP-CSI-RS is obtained according to the information indicated by the DCI, regardless of the relationship between the time interval between the PDCCH and the PDSCH and the predetermined threshold.

When none of the TCI configuration indication received by the terminal for one frequency domain bandwidth/frequency domain bandwidth group includes the quasi-co-location reference signal associated with the type-D quasi-co-location parameter and the indication of the PDCCH does not include the TCI indication information, the TCI information of the PDSCH/AP-CSI-RS is obtained according to the quasi-co-location reference signal of the PDCCH, regardless of the relationship between the time interval between the PDCCH and the PDSCH and the predetermined threshold.

One frequency domain bandwidth includes at least one of a CC or a BWP.

In an embodiment, one frequency domain bandwidth group belongs to one Intra-Band.

Embodiment Seven

In this embodiment, the time interval length corresponding to capability information 1 reported by the terminal is greater than the time interval length corresponding to capability information 2 reported by the terminal. Capability information 1 indicates a minimum time interval between the PDCCH and the PDSCH/AP-CSI-RS when the BWP is switched, and capability information 2 indicates a minimum time interval required for the terminal to use the TCI information indicated by the PDCCH for the reception of the PDSCH/AP-CSI-RS.

The time interval corresponding to the capability information is calculated in seconds instead of the number of time domain symbols.

Embodiment Eight

In this embodiment, when the sixth predetermined condition is satisfied, the quasi-co-location reference signal of the PDSCH/AP-CSI-RS is obtained according to the quasi-co-location reference signal of the PDCCH.

The sixth predetermined condition includes at least one of the following conditions.

The PDCCH does not include quasi-co-location reference signal indication information.

The time interval between the PDCCH and the PDSCH/AP-CSI-RS is greater than or equal to the predetermined threshold.

None of the TCI configuration indication received by the terminal includes the quasi-co-location reference signal associated with the type-D quasi-co-location parameter.

None of the TCI configuration indication for one frequency domain bandwidth/frequency domain bandwidth group includes the quasi-co-location reference signal associated with the type-D quasi-co-location parameter.

Embodiment Nine

In this embodiment, one CSI-RS resource identifier (ID) in one CC may be configured in more than one resource setting, one BWP-ID is configured in each resource setting, and thus it is necessary to predetermine that the BWPs corresponding to BWP-IDs in multiple resource settings in which one CSI-RS resource ID is located satisfy a predetermined condition. For example, the BWP-IDs in multiple resource settings in which one CSI-RS resource ID is located are the same. One resource setting includes at least one resource set, and each resource set includes at least one resource.

The above-mentioned predetermination is only suitable for the CSI-RS for Tracking, that is, the TRS reference signal.

Embodiment Ten

In this embodiment, one CSI-RS resource ID of one CC may be configured in more than one resource setting, and one BWP-ID is configured in each resource setting.

In the configuration indication of the TCI, a quasi-co-location reference signals (CSI-RS resource ID, CC index information, BWP index information) are configured. It is agreed that the BWP index information (that is, BWP-ID information) corresponding to the CSI-RS resource ID configured in the TCI is the same as the BWP-ID configured in one of the at least one resource setting in which the CSI-RS resource ID is located.

The above-mentioned predetermination is only suitable for the CSI-RS for Tracking, that is, the TRS reference signal.

Embodiment Eleven

In this embodiment, in the RRC control signaling for configuring the quasi-co-location reference signal set for CORESET0/search space 0, or in the MAC-CE control signaling for activating the quasi-co-location reference signal set for CORESET0, more than one piece of SSB index information is configured for CORESET0/search space, one piece of SSB index information corresponds to one period monitoring occasion of CORESET0/search space 0, and the terminal obtains more than one period monitoring occasion of CORESET0/search space according to the more than one piece of SSB index information.

The terminal monitors CORESET0/search space 0 in more than one period monitoring occasion.

When the quasi-co-location reference signal of the PDSCH/AP-CSI-RS is obtained according to the quasi-co-location reference signal of CORESET0/search space 0, the base station needs to notify of or agree with the terminal on which of more than one SSB index corresponding to CORESET0/search space 0 is obtained.

One SSB index corresponds to one synchronization signal/physical broadcast channel block (SS/PBCHB).

Embodiment Twelve

It is specified in the NR that the terminal needs to report maxNumberActiveTCI-PerBWP for indicating the maximum number of TCIs activated for the terminal in one BWP of one CC for control and data, where the maxNumberActiveTCI-PerBWP belongs to {1, 2, 4, 8}. When maxNumberActiveTCI-PerBWP reported by the terminal is 1, the maximum number of TCIs activated for control and data in one BWP of one CC is 1. The number of TCIs configured by the base station for the terminal in one BWP of one CC and activated for control and data of the terminal cannot exceed the capability reported by the terminal. The number of TCIs configured by the base station for the terminal in one BWP of one CC and activated for control and data of the terminal does not include at least one of the following TCIs, or when maxNumberActiveTCI-PerBWP reported by the terminal is 1, the number of TCIs configured by the base station for the terminal in one BWP of one CC and activated for control and data of the terminal does not include at least one of the following TCIs.

TCI1: a TCI state of COERSET0, for example, one TCI state configured by the base station for CORESET0 through signaling information.

TCI2: the quasi-co-location reference signal of COERSET0, for example, when the terminal selects an SSB in random access, or when the base station configures one SSB index, instead of one TCI state index, for CORESET0 through signaling, but not when the base station configures one TCI state for CORESET0 through signaling, the quasi-co-location reference signal of CORESET0 is not counted in the number of activated TCIs.

TCI3: the quasi-co-location reference signal of CORESET-Beam Failure and Recovery (BFR), which is a reference signal reported by the terminal in a beam failure request, and which is not counted in the number of activated TCIs.

When the maxNumberActiveTCI-PerBWP reported by the terminal is 1, since the BFR occurs randomly, there can be no activated TCIs other than the CORESET-BFR, or at least one of the following schemes may be adopted.

Scheme 1: after beam failure is monitored and before a reconfiguration of the base station for the PDCCH is received, the number of activated TCIs is 2, while the number of activated TCIs in other time periods is 1.

Scheme 2: the number of activated TCIs is determined according to max(maxNumberActiveTCI-PerBWP, size (q0)+1), where size(q0) is the number of reference signals included in a beam failure monitoring reference signal set q0.

Scheme 3: after a BFR parameter is configured for the terminal or in response to a BFR function being supported in the capability information reported by the terminal, maxNumberActiveTCI-PerBWP information reported by the terminal cannot be 1.

Scheme 4: from a predetermined time after the beam failure is monitored to a moment when the reconfiguration of the base station for the PDCCH is received, quasi-co-location reference signals of all CORESETs/all proprietary CORESETs are updated to new reference signals reported by the terminal.

Figure 6:
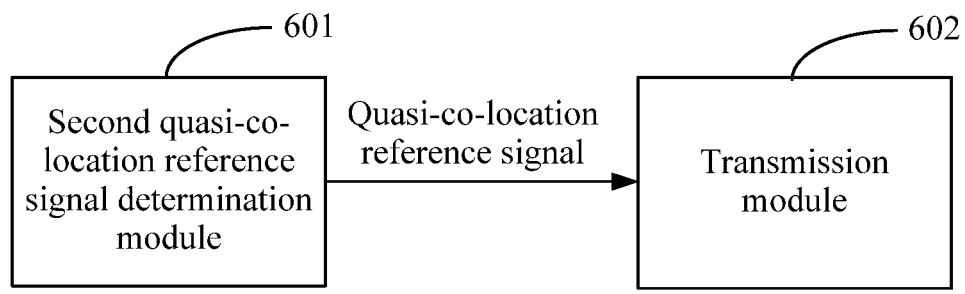
FIG. 6 is a structural diagram of an apparatus for determining a quasi-co-location reference signal according to an embodiment of the present disclosure.

With reference to FIG. 6, another embodiment of the present disclosure provides an apparatus for determining a quasi-co-location reference signal. The apparatus includes a second quasi-co-location reference signal determination module 601.

The second quasi-co-location reference signal determination module 601 is configured to, in response to at least one of a channel or a signal corresponding to a reference signal satisfying the third predetermined condition, determine a quasi-co-location reference signal of the reference parameter according to a quasi-co-location reference signal of a control channel element satisfying a fifth predetermined characteristic in a second time unit, where the second time unit is latest to at least one of the channel or the signal corresponding to the reference signal and is in a set of first time units, and each of the first time units includes a control channel element satisfying a fourth predetermined characteristic.

In another embodiment of the present disclosure, the apparatus further includes a transmission module 602.

The transmission module 602 is configured to transmit the reference signal according to the quasi-co-location reference signal of the reference parameter.

In another embodiment of the present disclosure, the fourth predetermined characteristic includes at least one of the following characteristics.

An intersection of the control channel element and a control channel element whose index is 0 is null, that is, the control channel element is not CORESET0.

In response to the first time unit satisfying a fourth predetermined condition, the control channel element includes the control channel element whose index is 0.

The control channel element and at least one of the channel or the signal corresponding to the reference signal are in the same frequency domain bandwidth.

The control channel element and a BWP in an active state in the first time unit satisfy a sixth predetermined characteristic.

A first frequency domain resource in which the control channel element is located and a second frequency domain resource corresponding to the BWP in the active state in the first time unit satisfy a fifth predetermined condition.

A third frequency domain resource and the second frequency domain resource corresponding to the BWP in the active state in the first time unit satisfy the fifth predetermined condition, where a quasi-co-location reference signal of the control channel element is located in the third frequency domain resource and is associated with a type of quasi-co-location parameters.

In another embodiment of the present disclosure, that the first time unit satisfies the fourth predetermined condition includes at least one of the following conditions.

The BWP in the active state in the first time unit is a predetermined BWP, where the predetermined BWP includes one of a BWP whose index is 0, a BWP whose index is 1, or a transmission configuration indication list corresponding to a control channel element whose index is 0 belongs to a transmission configuration indication list corresponding to the channel element included in the predetermined BWP.

The BWP in the active state in the first time unit includes a frequency domain resource corresponding to an initial BWP.

The BWP in the active state in the first time unit and the control channel element whose index is 0 satisfy the sixth predetermined characteristic.

In another embodiment of the present disclosure, that the control channel element and the BWP in the active state in the first time unit satisfy the sixth predetermined characteristic includes at least one of the following characteristics.

Configuration indication of the BWP includes configuration indication of the control channel element.

The configuration indication of the BWP includes configuration indication of at least one search space set, and the at least one search space set is associated with the control channel element. That is to say, frequency domain resources of the search space are frequency domain resources occupied by the control channel element, and candidate control channels in the search space set are distributed among the frequency domain resources determined by the control channel element.

The BWP includes a frequency domain resource in which the control channel element is located.

The BWP includes a frequency domain resource corresponding to a first BWP, where configuration indication of the first BWP includes the configuration indication of the control channel element.

An intersection between a time resource of the BWP in the active state and a monitoring time resource of the control channel element is non-null, where a monitoring time of the control channel element is a union set of monitoring times of at least one search space set associated with the control channel element.

In another embodiment of the present disclosure, the control channel element satisfying the fifth predetermined characteristic includes a control channel element, where the control channel element has the lowest control channel element index in a set composed of control channel elements, the control channel elements satisfy the fourth predetermined characteristic in the second time unit, and the second time unit is closest to at least one of the channel or the signal corresponding to the reference signal.

In another embodiment of the present disclosure, that at least one of the channel or the signal corresponding to the reference signal satisfies the third predetermined condition includes at least one of the following conditions.

A time interval between a control channel and at least one of the channel or the signal corresponding to the reference signal is less than a predetermined threshold. The control channel is used for scheduling at least one of the channel or the signal corresponding to the reference signal A fourth frequency domain resource and a fifth frequency domain resource in which at least one of the channel or the signal corresponding to the reference signal is located do not satisfy the fifth predetermined condition, and the control channel for scheduling at least one of the channel or the signal corresponding to the reference signal does not include indication information of transmission configuration indication. A quasi-co-location reference signal of the control channel is located in the fourth frequency domain resource and is associated with a type of quasi-co-location parameters, and the control channel is used for scheduling at least one of the channel or the signal corresponding to the reference signal.

A sixth frequency domain resource and the fifth frequency domain resource in which at least one of the channel or the signal corresponding to the reference signal is located do not satisfy the fifth predetermined condition, and the control channel for scheduling at least one of the channel or the signal corresponding to the reference signal does not include the indication information of the transmission configuration indication. The control channel is located in the sixth frequency domain resource and is used for scheduling at least one of the channel or the signal corresponding to the reference signal.

A twelfth frequency domain resource and the fifth frequency domain resource in which at least one of the channel or the signal corresponding to the reference signal is located satisfy the fifth predetermined condition. A quasi-co-location reference signal of the control channel element is located in the twelfth frequency domain resource and is associated with a type of quasi-co-location parameters, and the control channel element satisfies the fifth predetermined characteristic.

A thirteenth frequency domain resource in which a second signal is located and the fifth frequency domain resource in which at least one of the channel or the signal corresponding to the reference signal is located satisfy the fifth predetermined condition, where the second signal and a quasi-co-location reference signal of the control channel satisfy a quasi-co-location relationship with respect to a type of quasi-co-location parameters. The control channel satisfies the fifth predetermined characteristic or is used for scheduling the reference signal.

A thirteen frequency domain resource in which the control channel element satisfying the fifth predetermined characteristic is located and the fifth frequency domain resource in which at least one of the channel or the signal corresponding to the reference signal is located satisfy the fifth predetermined condition.

A seventh frequency domain resource and the fifth frequency domain resource in which at least one of the channel or the signal corresponding to the reference signal is located do not satisfy the fifth predetermined condition. A quasi-co-location reference signal is located in the seventh frequency domain resource and is associated with a type of quasi-co-location parameters in transmission configuration indication, and the transmission configuration indication is used for indicating the reference signal and is in the control channel for scheduling the reference signal.

A quasi-co-location reference signal is received. The quasi-co-location reference signal is associated with a spatial reception filtering parameter which is included in at least one piece of transmission configuration indication information.

In another embodiment of the present disclosure, the predetermined threshold is obtained according to at least one of reported capability information; the subcarrier spacing corresponding to at least one of the channel or the signal corresponding to the reference signal; a subcarrier spacing corresponding to the reported capability information; a subcarrier spacing corresponding to the control channel for scheduling at least one of the channel or the signal corresponding to the reference signal; a subcarrier spacing corresponding to a control channel element satisfying the fifth predetermined characteristic; or a subcarrier spacing used for calculating the time interval.

In another embodiment of the present disclosure, the time interval is obtained according to at least one of a subcarrier spacing corresponding to the control channel for scheduling at least one of the channel or the signal corresponding to the reference signal; a subcarrier spacing corresponding to at least one of the channel or the signal corresponding to the reference signal; a subcarrier spacing corresponding to the predetermined threshold; or a subcarrier spacing used for calculating the time interval.

In another embodiment of the present disclosure, at least one of the channel or the signal corresponding to the reference signal satisfies one of the following characteristics.

The fifth frequency domain resource in which at least one of the channel or the signal corresponding to the reference signal is located and the eighth frequency domain resource satisfy the fifth predetermined condition. The quasi-co-location reference signal is located in the eighth frequency domain resource and is associated with a type of quasi-co-location parameters, of the reference signal.

The fifth frequency domain resource in which at least one of the channel or the signal corresponding to the reference signal is located and the ninth frequency domain resource in which a second signal is located satisfy the fifth predetermined condition, where the second signal and the reference signal satisfy a quasi-co-location relationship with respect to a type of quasi-co-location parameters.

In response to a frequency domain bandwidth in which at least one of the channel or the signal corresponding to the reference signal is located being different from a frequency domain bandwidth in which the quasi-co-location reference signal of the reference signal is located, the fifth frequency domain resource in which at least one of the channel or the signal corresponding to the reference signal is located and the eighth frequency domain resource in which the quasi-co-location reference signal of the reference signal is located satisfy the fifth predetermined condition, where the quasi-co-location reference signal is associated with the type of quasi-co-location parameters.

In response to the frequency domain bandwidth in which at least one of the channel or the signal corresponding to the reference signal is located being different from a frequency domain bandwidth in which the second signal is located, the fifth frequency domain resource in which at least one of the channel or the signal corresponding to the reference signal is located and a ninth frequency domain resource in which the second signal is located satisfy the fifth predetermined condition, where the second signal and the quasi-co-location reference signal of the reference parameter satisfy a quasi-co-location relationship with respect to a type of quasi-co-location parameters.

In response to the frequency domain bandwidth in which at least one of the channel or the signal corresponding to the reference signal is located being different from the frequency domain bandwidth in which the quasi-co-location reference signal of the reference signal is located and the fifth frequency domain resource in which at least one of the channel or the signal corresponding to the reference signal is located and the eighth frequency domain resource in which the quasi-co-location reference signal of the reference signal is located not satisfying the fifth predetermined condition, the third predetermined condition is satisfied. The quasi-co-location reference signal is associated with the type of quasi-co-location parameters, In response to the frequency domain bandwidth in which the at least one of the channel or the signal corresponding to the reference signal is located being different from the frequency domain bandwidth in which the second signal is located and the fifth frequency domain resource in which the at least one of the channel or the signal corresponding to the reference signal is located and the tenth frequency domain resource in which the second signal is located satisfying the fifth predetermined condition, the third predetermined condition is satisfied, where the second signal and the quasi-co-location reference signal of the reference parameter satisfy a quasi-co-location relationship with respect to a type of quasi-co-location parameters.

In another embodiment of the present disclosure, in response to at least one of the quasi-co-location reference signal of the reference parameter or the second signal being a tracking reference signal, a frequency domain span of the tracking reference signal is greater than or equal to a frequency domain span Y, where the frequency domain span Y is obtained in one of the following manners.

In response to a period of the tracking reference signal belonging to a first period set, Y is min (52 PRBs, a frequency domain span corresponding to at least one of the channel or the signal corresponding to the reference signal).

In response to the period of the tracking reference signal not belonging to the first period set, Y is the frequency domain span corresponding to the channel and/or the signal corresponding to the reference signal.

In the above manners, the frequency domain span corresponding to the at least one of the channel or the signal corresponding to the reference signal includes at least one of a set of frequency domain resource blocks comprised in a bandwidth part in which at least one of the channel or the signal corresponding to the reference signal is located; or a set of frequency domain resource blocks between the highest indexed frequency domain resource block and the highest indexed resource block in a set of frequency domain resource blocks occupied by at least one of the channel or the signal corresponding to the reference signal.

In another embodiment of the present disclosure, the first period set includes the following period: 10 milliseconds.

In another embodiment of the present disclosure, that two frequency domain resources satisfy the fifth predetermined condition includes at least one of the following conditions.

A difference set of the two frequency domain resources is null, that is, the two frequency domain resources are the same frequency domain resource. For example, when the above-mentioned frequency domain resource is a CC/BWP, the CC1/BWP1 corresponding to one frequency domain resource and the CC2/BWP2 corresponding to the other frequency domain resource are the same BWP. For another example, when the above-mentioned frequency domain resource is a frequency domain resource block set, a frequency domain resource block set corresponding to one frequency domain resource is the same as a frequency domain resource block set corresponding to the other frequency domain resource. For another example, when the above-mentioned frequency domain resource is a span corresponding to a frequency domain resource block set, the span corresponding to the frequency domain resource block set corresponding to one frequency domain resource is the same as the span corresponding to the frequency domain resource block set corresponding to the other frequency domain resource.

A difference between a frequency domain span included in one of the two frequency domain resources and a frequency domain span included in the other of the two frequency domain resources is less than a predetermined value.

One of the two frequency domain resources belongs to the other of the two frequency domain resources.

An intersection of the two frequency domain resources is non-null.

Subcarrier spacings of the two frequency domain resources are the same.

In another embodiment of the present disclosure, the type of quasi-co-location parameters satisfies at least one of the following characteristics.

The type of quasi-co-location parameters includes at least one of a Doppler shift, a Doppler spread, an average delay, a delay spread, or an average gain.

The type of quasi-co-location parameters does not include a spatial reception filtering parameter.

In another embodiment of the present disclosure, the frequency domain resource in which at least one of the channel, the signal, or the control channel element is located includes at least one of a CC in which at least one of the channel, the signal, or the control channel element is located; a BWP of the CC in which at least one of the channel, the signal, or the control channel element is located; a set of frequency domain resource blocks occupied by at least one of the channel, the signal, or the control channel element is located; or a frequency domain span corresponding to the set of frequency domain resource blocks occupied by at least one of the channel, the signal, or the control channel element is located.

In another embodiment of the present disclosure, the method further includes the step described below.

In response to no first time unit including the control channel element satisfying the fourth predetermined characteristic, scheduling information satisfying the third predetermined condition is not wanted to be received.

The implementation process of the apparatus for determining a quasi-co-location reference signal of the embodiments of the present disclosure is the same as the implementation process of the method for determining a quasico-location reference signal in the above-mentioned embodiments, and will not be repeated herein.

Another embodiment of the present disclosure provides a device for determining a quasi-co-location reference signal. The device includes a processor and a computer-readable storage medium, where the computer-readable storage medium is configured to store instructions which, when executed by the processor, implement any of the methods for determining a quasi-co-location reference signal described above.

Another embodiment of the present disclosure provides a computer-readable storage medium. The computer-readable storage medium stores a computer program which, when executed by a processor, implements steps of any of the methods for determining a quasi-co-location reference signal described above.

Another embodiment of the present disclosure provides a method for transmitting a reference signal. The method includes the steps described below.

Reference signal information is determined according to at least one of signaling information or a first predetermined rule, where a port of the reference signal information port is required to satisfy a second predetermined rule.

At least one of a reference signal, a channel corresponding to the reference signal, or a signal corresponding to the reference signal is transmitted according to the reference signal information.

In another embodiment of the present disclosure, the second predetermined rule includes at least one of the following rules.

The fifth frequency domain resource in which at least one of the channel or the signal corresponding to the reference signal is located and the eighth frequency domain resource in which the quasi-co-location reference signal of the reference signal is located satisfy the fifth predetermined condition. The quasi-co-location reference signal is associated with a type of quasi-co-location parameters.

The fifth frequency domain resource in which at least one of the channel or the signal corresponding to the reference signal is located and the ninth frequency domain resource in which the second signal is located satisfy the fifth predetermined condition, where the second signal and the reference signal satisfy a quasi-co-location relationship with respect to a type of quasi-co-location parameters.

In response to a frequency domain bandwidth in which at least one of the channel or the signal corresponding to the reference signal is located being different from a frequency domain bandwidth in which the quasi-co-location reference signal of the reference signal is located, the fifth frequency domain resource in which at least one of the channel or the signal corresponding to the reference signal is located and the eighth frequency domain resource in which the quasi-co-location reference signal of the reference signal is located satisfy the fifth predetermined condition. The quasi-co-location reference signal is associated with the type of quasi-co-location parameters.

In response to the frequency domain bandwidth in which at least one of the channel or the signal corresponding to the reference signal is located being different from the frequency domain bandwidth in which the second signal is located, the fifth frequency domain resource in which at least one of the channel or the signal corresponding to the reference signal is located and the ninth frequency domain resource in which the second signal is located satisfy the fifth predetermined condition, where the second signal and the quasi-co-location reference signal of the reference parameter satisfy a quasi-co-location relationship with respect to a type of quasi-co-location parameters.

In another embodiment of the present disclosure, the reference signal includes at least one of a demodulation reference signal, a measurement reference signal, a PTRS, a CSI-RS for Tracking (TRS), or a channel corresponding to the demodulation reference signal.

At least one of the quasi-co-location reference signal or the second signal includes at least one of: a measurement reference signal, a measurement reference signal for tracking, or a synchronization signal.

In another embodiment of the present disclosure, in response to at least one of the quasi-co-location reference signal of the reference parameter or the second signal being a tracking reference signal, a frequency domain span of the tracking reference signal is greater than or equal to a frequency domain span Y, where the frequency domain span Y is obtained in at least one of the following manners.

In response to a period of the tracking reference signal belonging to a first period set, Y is min (52 PRBs, a frequency domain span corresponding to at least one of the channel or the signal corresponding to the reference signal).

In response to the period of the tracking reference signal not belonging to the first period set, Y is the frequency domain span corresponding to at least one of the channel or the signal corresponding to the reference signal.

In the above manners, the frequency domain span corresponding to at least one of the channel or the signal corresponding to the reference signal includes one of a set of frequency domain resource blocks comprised in a bandwidth part in which at least one of the channel or the signal corresponding to the reference signal is located; or a set of frequency domain resource blocks between the highest indexed frequency domain resource block and the highest indexed resource block in a set of frequency domain resource blocks occupied by at least one of the channel or the signal corresponding to the reference signal.

In another embodiment of the present disclosure, the first period set includes the following period: 10 milliseconds.

In another embodiment of the present disclosure, the second predetermined rule includes at least one of the following rules.

In response to none of transmission configuration indication information including a quasi-co-location reference signal associated with a spatial reception filtering parameter and control signaling carrying quasi-co-location reference signal information of the reference signal, the quasi-co-location reference signal of the reference signal is obtained according to the quasi-co-location reference signal information carrying the reference signal.

In response to none of transmission configuration indication information including the quasi-co-location reference signal associated with the spatial reception filtering parameter and the control signaling not carrying the quasi-co-location reference signal information of the reference signal, the quasi-co-location reference signal of the reference signal is obtained according to a quasi-co-location reference signal of a control channel for scheduling the reference signal.

In response to none of transmission configuration indication information including the quasi-co-location reference signal associated with the spatial reception filtering parameter and the control signaling not carrying the quasi-co-location reference signal information of the reference signal, the quasi-co-location reference signal of the reference signal is obtained according to a reference signal selected by a communication node in random access.

In response to none of transmission configuration indication information including the quasi-co-location reference signal associated with the spatial reception filtering parameter in a predetermined frequency domain bandwidth group and the control signaling carrying the quasi-co-location reference signal information of the reference signal, the quasi-co-location reference signal of the reference signal is obtained according to the quasi-co-location reference signal information carrying the reference signal.

In response to none of transmission configuration indication information including the quasi-co-location reference signal associated with the spatial reception filtering parameter in the predetermined frequency domain bandwidth group and the control signaling not carrying the quasi-co-location reference signal information of the reference signal, the quasi-co-location reference signal of the reference signal is obtained according to the quasi-co-location reference signal for scheduling the control channel of the reference signal.

In response to none of transmission configuration indication information including the quasi-co-location reference signal associated with the spatial reception filtering parameter in the predetermined frequency domain bandwidth group and the control signaling not carrying the quasi-co-location reference signal information of the reference signal, the quasi-co-location reference signal of the reference signal is obtained according to the reference signal selected by the communication node in random access.

In the above rules, the control signaling is included in a physical layer control channel.

In another embodiment of the present disclosure, the step in which the reference signal information is determined according to at least one of signaling information or the first predetermined rule, where a port of the reference signal information is required to satisfy the second predetermined rule, includes that, in response to the control signaling not including quasi-co-location reference signal indication information, the first predetermined rule includes at least one of the following rules.

In response to the fifth frequency domain resource in which at least one of the channel or the signal corresponding to the reference signal is located and the ninth frequency domain resource in which the quasi-co-location reference signal, which is associated with a type of quasi-co-location parameters, of the control channel is located satisfying the fifth predetermined condition, the quasi-co-location reference signal of the reference signal is obtained according to the quasi-co-location reference signal of the control channel.

In response to the fifth frequency domain resource in which at least one of the channel or the signal corresponding to the reference signal is located and the eleventh frequency domain resource in which the control channel is located satisfying the fifth predetermined condition, the quasi-co-location reference signal of the reference signal is obtained according to the quasi-co-location reference signal of the control channel.

In response to the fifth frequency domain resource in which at least one of the channel or the signal corresponding to the reference signal is located and the ninth frequency domain resource in which the quasi-co-location reference signal, which is associated with a type of quasi-co-location parameters, of the control channel is located not satisfying the fifth predetermined condition, the time interval between the control channel and at least one of the channel or the signal corresponding to the reference signal is less than the predetermined threshold.

In response to the fifth frequency domain resource in which at least one of the channel or the signal corresponding to the reference signal is located and the eleventh frequency domain resource in which the control channel is located not satisfying the fifth predetermined condition, the time interval between the control channel and at least one of the channel or the signal corresponding to the reference signal is less than the predetermined threshold.

In the above rules, the control channel is at least one of the control channel for scheduling the reference signal or the control signaling which is transmitted in the control channel.

In another embodiment of the present disclosure, two frequency domain resources satisfy the fifth predetermined condition that includes at least one of the following conditions.

A difference set of the two frequency domain resources is null.

A difference between a frequency domain span included in one of the two frequency domain resources and a frequency domain span included in the other of the two frequency domain resources is less than a predetermined value.

One of the two frequency domain resources belongs to the other of the two frequency domain resources.

An intersection of the two frequency domain resources is non-null.

Subcarrier spacings of the two frequency domain resources are the same.

In another embodiment of the present disclosure, the type of quasi-co-location parameters satisfies at least one of the following characteristics.

The type of quasi-co-location parameters includes at least one of a Doppler shift, a Doppler spread, an average delay, a delay spread, or an average gain.

The type of quasi-co-location parameters does not include a spatial reception filtering parameter.

In another embodiment of the present disclosure, the frequency domain resource in which at least one of the channel, the signal, or the control channel element is located includes at least one of a component carrier in which at least one of the channel or the signal is located; a bandwidth part of the component carrier in which at least one of the channel or the signal is located; a set of frequency domain resource blocks occupied by at least one of the channel or the signal; or a frequency domain span corresponding to the set of frequency domain resource blocks occupied by at least one of the channel or the signal.

In another embodiment of the present disclosure, that the port of the reference signal information port is required to satisfy the second predetermined rule includes the following rule.

The control signaling includes transmission configuration indication information which includes a reference signal index and BWP index information, where the BWP index information belongs to a BWP index configured in one resource setting in which the reference signal index is located.

In another embodiment of the present disclosure, that the port of the reference signal information is required to satisfy the second predetermined rule includes at least one of the following rules.

The control signaling includes configuration indication of more than one resource setting, where in response to the more than one resource setting including the same CSI-RS ID, BWP indexes configured in the more than one resource setting are the same, where the more than one resource setting belongs to one CC.

The maximum number of pieces of configuration indication information that is configured by the base station for one terminal in one BWP of one CC and activated for at least one of a data channel or a control channel does not exceed the maximum number of pieces of configuration indication information that is reported by the terminal, supported in one BWP of one CC and activated for at least one of the data channel or the control channel.

The maximum number of pieces of configuration indication information that is configured by the base station for one terminal in one BWP of one CC and activated for at least one of the data channel or the control channel is determined according to max(maxNumberActiveTCI-PerBWP, size (q0)+1), where size(q0) is the number of reference signals included in the beam failure monitoring reference signal set q0, and maxNumberActiveTCI-PerBWP is the maximum number of pieces of configuration indication information that is reported by the terminal, supported in one BWP of one CC and activated for at least one of the data channel or the control channel.

In another embodiment of the present disclosure, when the number of pieces of configuration indication information that is configured by the base station for one terminal in one BWP of one CC and activated for at least one of the data channel or the control channel is calculated, the number does not include at least one of a TCI state of COERSET0; a quasi-co-location reference signal of COERSET0; or a quasi-co-location reference signal of the CORESET-BFR.

In another embodiment of the present disclosure, in response to the maximum number of pieces of configuration indication information that is reported by the terminal, supported in one BWP of one CC and activated for at least one of the data channel or the control channel being 1, at least one of the following schemes is adopted.

Scheme 1: after beam failure is monitored and before a reconfiguration of the base station for the PDCCH is received, the maximum number of pieces of the activated configuration indication information is 2, while the maximum number of pieces of the activated configuration indication information in other time periods is 1.

Scheme 2: the maximum number of pieces of the activated configuration indication information is determined according to max(maxNumberActiveTCI-PerBWP, size (q0)+1), where size(q0) is the number of reference signals included in the beam failure monitoring reference signal set q0.

Scheme 3: after a BFR parameter is configured for the terminal or in response to a BFR function being supported in the capability information reported by the terminal, maxNumberActiveTCI-PerBWP information reported by the terminal cannot be 1.

Scheme 4: from a predetermined time after the beam failure is monitored to a moment when the reconfiguration of the base station for the PDCCH is received, quasi-co-location reference signals of all CORESETs/all proprietary CORESETs are updated to new reference signals reported by the terminal.

In another embodiment of the present disclosure, in the step in which the reference signal information is determined according to at least one of signaling information or the first predetermined rule, where the reference signal information port is required to satisfy the second predetermined rule, the first predetermined rule includes at least one of the following rules.

In response to the control channel for scheduling the reference signal and at least one of the channel or the signal corresponding to the reference signal being in different frequency domain bandwidths, a time interval between the control channel for scheduling the reference signal and at least one of the channel or the signal corresponding to the reference signal is greater than or equal to the predetermined threshold.

The time interval length corresponding to first capability information reported by the terminal is greater than the time interval length corresponding to second capability information reported by the terminal, where the first capability information indicates the minimum time interval between the PDCCH and the PDSCH/AP-CSI-RS during BWP switch, and the second capability information indicates the minimum time interval required for the terminal to use TCI information indicated by the PDCCH for receiving the PDSCH/AP-CSI-RS.

In another embodiment of the present disclosure, the predetermined threshold is obtained according to at least one of reported capability information; the subcarrier spacing corresponding to the control channel element satisfying the fifth predetermined characteristic; a subcarrier spacing corresponding to the reported capability information; a subcarrier spacing corresponding to the control channel for scheduling the reference signal; a subcarrier spacing corresponding to a control channel element satisfying the fifth predetermined characteristic; or a subcarrier spacing used for calculating the time interval.

In another embodiment of the present disclosure, the time interval is obtained according to at least one of a subcarrier spacing corresponding to the control channel for scheduling the reference signal; a subcarrier spacing corresponding to the control channel element satisfying the fifth predetermined characteristic; or a subcarrier spacing used for calculating the time interval.

Another embodiment of the present disclosure provides an apparatus for transmitting a reference signal. The apparatus includes a determination module and a second transmission module.

The determination module is configured to determine reference signal information according to at least one of signaling information or a first predetermined rule, where a reference signal information port is required to satisfy a second predetermined rule.

The second transmission module is configured to transmit, according to the reference signal information, at least one of: the reference signal, a channel corresponding to the reference signal, or a signal corresponding to the reference signal.

The implementation process of the apparatus for transmitting a reference signal is the same as the implementation process of methods for transmitting a reference signal in the above-mentioned embodiments, and will not be repeated herein.

Another embodiment of the present disclosure provides a device for transmitting a reference signal. The device includes a processor and a computer-readable storage medium, where the computer-readable storage medium is configured to store instructions which, when executed by the processor, implement any of the methods for transmitting a reference signal described above.

Another embodiment of the present disclosure provides a computer-readable storage medium, which is configured to store a computer program which, when executed by a processor, implements steps of any of the methods for transmitting a reference signal described above.

It is to be understood by those of ordinary skill in the art that all or some of the steps of the preceding disclosed methods and at least one of function modules or function units in the preceding disclosed system and apparatuses may be implemented as software, firmware, hardware, or an appropriate combination thereof. In the hardware implementation, the division of the functional modules/units mentioned in the above description may not correspond to the division of physical components. For example, one physical component may have multiple functions, or one function or step may be performed jointly by several physical components. Some or all of the components may be implemented as software executed by a processor such as a digital signal processor or a microprocessor, may be implemented as hardware, or may be implemented as an integrated circuit such as an application-specific integrated circuit. Such software may be distributed over computer-readable media. The computer-readable media may include computer storage media (or non-transitory media) and communication media (or transitory media). As is known to those of ordinary skill in the art, the term computer storage media include volatile and non-volatile as well as removable and non-removable media implemented in any method or technology for storing information (such as computer-readable instructions, data structures, program modules or other data). Computer storage media include, but are not limited to, random access memories (RAMs), read-only memories (ROMs), electrically erasable programmable read-only memories (EE-PROMs), flash memories or other memory technologies; compact disc-read only memories (CD-ROMs), digital versatile disks (DVDs) or other optical disk memories; magnetic cassettes, magnetic tapes, disk memories or other magnetic storage devices, or any other medium used for storing desired information and accessed by a computer. Moreover, it is known to those of ordinary skill in the art that communication media typically include computer-readable instructions, data structures, program modules or other data in modulated data signals such as carrier waves or other transport mechanisms and may include any information delivery medium.

What is claimed is:

1. A method for determining a quasi-co-location reference signal, comprising:
   determining a first transmission configuration indication list corresponding to a first control channel element;
   determining, in the first transmission configuration indication list, index information of transmission configuration indication activated for the first control channel element according to second control signaling which is MAC-CE signaling and comprises the index information; and
   determining a quasi-co-location reference signal activated for the first control channel element according to the index information and the first transmission configuration indication list;
   wherein one piece of transmission configuration indication in the first transmission configuration indication list corresponds to at least one quasi-co-location reference signal set.

2. The method of claim 1, wherein the determining a first transmission configuration indication list corresponding to a first control channel element comprises:
   determining the first transmission configuration indication list according to determination of whether the first control channel element belongs to a predetermined control channel element set.

3. The method of claim 2, wherein the determining the first transmission configuration indication list according to determination of whether the first control channel element belongs to a predetermined control channel element set comprises at least one of:
   in response to the first control channel element not belonging to the predetermined control channel element set, determining the first transmission configuration indication list to be a transmission configuration indication list configured for the first control channel element in third control signaling, wherein the third control signaling carries a first control channel element index; or
   in response to the first control channel element belonging to the predetermined control channel element set, determining that the first transmission configuration indication list belongs to a transmission configuration indication list configured for a third channel element in fourth control signaling wherein the third channel element comprises a data channel element;
   wherein the predetermined control channel element set comprises at least one of a control channel resource set 0 or a search space set 0.

4. The method of claim 3, wherein the third channel element satisfies at least one of following characteristics:
   a bandwidth part in which the third channel element is located satisfies the first predetermined characteristic at a predetermined time; or
   the transmission configuration indication list configured for the third channel element satisfies a third predetermined characteristic.

5. The method of claim 4, wherein the first predetermined characteristic comprises at least one of:
   the bandwidth part is in an active state; or
   the bandwidth part comprises a resource occupied by the first control channel element.

6. The method of claim 4, wherein the predetermined time comprises one of:
   a start time at which transmission configuration indication carried in the second control signaling is capable of being used for receiving the first control channel element or a time unit in which the start time is located;
   the predetermined time which is associated with second control signaling information; or
   a monitoring time of the first control channel element or a time unit in which the monitoring time is located.

7. The method of claim 3, wherein the first transmission configuration indication list belongs to an $X^{th}$ transmission configuration indication list, which comprises:
   a quasi-co-location reference signal corresponding to the transmission configuration indication and a synchronization signal satisfy a quasi-co-location relationship with respect to a type of quasi-co-location parameters, wherein the transmission configuration indication belongs to the first transmission configuration indication list in the $X^{th}$ transmission configuration indication list, and X is a value ranging from 2 to 7.

8. The method of claim 4, wherein the third predetermined characteristic comprises at least one of:
   the number of pieces of first-type transmission configuration indication is greater than a fourth predetermined value, wherein the pieces of first-type transmission configuration indication are comprised in the transmission configuration indication list configured for the third channel element, and each quasi-co-location reference signal corresponding to the first-type transmission configuration indication and a synchronization signal satisfy a quasi-co-location relationship; or the number of pieces of second-type transmission configuration indication is greater than the fifth predetermined value, wherein the pieces of second-type transmission configuration indication are comprised in the transmission configuration indication list configured for the third channel element; and there is a quasi-co-location relationship between a quasi-co-location reference signal corresponding to the second-type transmission configuration indication and associated with a type of quasi-co-location parameters and a synchronization signal.

9. The method of claim 1, wherein the quasi-co-location reference signal activated for the first control channel element corresponds to at least two synchronization signal blocks, and the method further comprises:
   determining a respective monitoring occasion of the first control channel element according to each of the at least two synchronization signal blocks corresponding to the quasi-co-location reference signal activated for the first control channel element;
   wherein the first control channel element comprises at least one of a control channel resource set 0 or a search space set 0.

10. An apparatus for determining a quasi-co-location reference signal, comprising a processor and a memory for storing execution instructions that when executed by the processor cause the processor to perform steps in following modules:
   a transmission configuration indication list determination module, which is configured to determine a first transmission configuration indication list corresponding to a first control channel element;
   a transmission configuration indication index information determination module, which is configured to determine, in the first transmission configuration indication list, index information of transmission configuration indication activated for the first control channel element according to second control signaling which is MAC-CE signaling and comprises the index information; and
   a first quasi-co-location reference signal determination module, which is configured to determine a quasi-co-location reference signal activated for the first control channel element according to the index information and the first transmission configuration indication list;
   wherein one piece of transmission configuration indication in the first transmission configuration indication list corresponds to at least one quasi-co-location reference signal set.

11. A non-transitory computer-readable storage medium, which is configured to store a computer program which, when executed by a processor, implements the following steps:
   determining a first transmission configuration indication list corresponding to a first control channel element;
   determining, in the first transmission configuration indication list, index information of transmission configuration indication activated for the first control channel element according to second control signaling which is MAC-CE signaling and comprises the index information; and
   determining a quasi-co-location reference signal activated for the first control channel element according to the index information and the first transmission configuration indication list;
   wherein one piece of transmission configuration indication in the first transmission configuration indication list corresponds to at least one quasi-co-location reference signal set.

12. The method of claim 1, further comprising:
   in response to satisfying a third predetermined condition, determining a quasi-co-location reference signal of a reference signal according to a quasi-co-location reference signal of a control channel resource set (CORESET) satisfying a fifth predetermined characteristic in a second time unit,
   wherein the second time unit is a latest time unit which comprises a CORESET satisfying a fourth predetermined characteristic and is latest to at least one of a channel or a signal corresponding to the reference signal;
   wherein a time interval between a control channel and at least one of the channel or the signal corresponding to the reference signal is less than a predetermined threshold, wherein the control channel schedules at least one of the channel or the signal corresponding to the reference signal; and
   wherein the predetermined threshold is obtained according to at least one of:
   capability information reported by a communication node corresponding to a subcarrier spacing used for calculating the time interval;
   a subcarrier spacing corresponding to at least one of the channel or the signal corresponding to the reference signal;
   a subcarrier spacing corresponding to the control channel for scheduling at least one of the channel or the signal corresponding to the reference signal; or
   a subcarrier spacing used for calculating the time interval.

13. The method of claim 12, wherein the time interval is obtained according to at least one of:
   the subcarrier spacing corresponding to the control channel for scheduling at least one of the channel or the signal corresponding to the reference signal;
   the subcarrier spacing corresponding to at least one of the channel or the signal corresponding to the reference signal;
   the subcarrier spacing used for calculating the time interval; or
   a ratio between a subcarrier spacing of a bandwidth part of the control channel and a subcarrier spacing of a bandwidth part of at least one of the channel or the signal.

14. The apparatus of claim 10, wherein the transmission configuration information list determination module 301 is configured to determine the first transmission configuration indication list according to determination of whether the first control channel element belongs to a predetermined control channel element set.

15. The apparatus of claim 14, wherein the transmission configuration information list determination module 301 is configured to determine the first transmission configuration information list according to the determination of whether the first control channel element belongs to a predetermined control channel element set by using at least one of the following manners:
   in response to the first control channel element not belonging to the predetermined control channel element set, determining the first transmission configuration indication list to be a transmission configuration indication list configured for the first control channel element in third control signaling, wherein the third control signaling carries a first control channel element index; or in response to the first control channel element belonging to the predetermined control channel element set, determining that the first transmission configuration indication list belongs to a transmission configuration indication list configured for a third channel element in fourth control signaling, wherein the third channel element comprises a data channel element;

wherein the predetermined control channel element set comprises at least one of a control channel resource set 0 or a search space set 0.

16. The apparatus of claim 15, wherein the third channel element satisfies at least one of following characteristics:
a bandwidth part in which the third channel element is located satisfies the first predetermined characteristic at a predetermined time; or
the transmission configuration indication list configured for the third channel element satisfies a third predetermined characteristic.

17. The apparatus of claim 16, wherein the first predetermined characteristic comprises at least one of:
the bandwidth part is in an active state; or
the bandwidth part comprises a resource occupied by the first control channel element.

18. The apparatus of claim 16, wherein the predetermined time comprises one of:
a start time at which transmission configuration indication carried in the second control signaling is capable of being used for receiving the first control channel element or a time unit in which the start time is located;
the predetermined time which is associated with second control signaling information; or
a monitoring time of the first control channel element or a time unit in which the monitoring time is located.

19. The apparatus of claim 15, wherein the third predetermined characteristic comprises at least one of:
the number of pieces of first-type transmission configuration indication is greater than a fourth predetermined value, wherein the pieces of first-type transmission configuration indication are comprised in the transmission configuration indication list configured for the third channel element, and each quasi-co-location reference signal corresponding to the first-type transmission configuration indication and a synchronization signal satisfy a quasi-co-location relationship; or
the number of pieces of second-type transmission configuration indication is greater than the fifth predetermined value, wherein the pieces of second-type transmission configuration indication are comprised in the transmission configuration indication list configured for the third channel element; and there is a quasi-co-location relationship between a synchronization signal and a quasi-co-location reference signal corresponding to the second-type transmission configuration indication and associated with a type of quasi-co-location parameters.

20. The apparatus of claim 10, further comprising:
a second quasi-co-location reference signal determination module 601, which is configured to, in response to satisfying a third predetermined condition, determine a quasi-co-location reference signal of a reference signal according to a quasi-co-location reference signal of a control channel resource set (CORESET) satisfying a fifth predetermined characteristic in a second time unit,
wherein the second time unit is a latest time unit which comprises a CORESET satisfying a fourth predetermined characteristic and is latest to at least one of a channel or a signal corresponding to the reference signal;
wherein a time interval between a control channel and at least one of the channel or the signal corresponding to the reference signal is less than a predetermined threshold, wherein the control channel schedules at least one of the channel or the signal corresponding to the reference signal; and
wherein the predetermined threshold is obtained according to at least one of:
capability information reported by a communication node corresponding to a subcarrier spacing used for calculating the time interval;
a subcarrier spacing corresponding to at least one of the channel or the signal corresponding to the reference signal;
a subcarrier spacing corresponding to the control channel for scheduling at least one of the channel or the signal corresponding to the reference signal; or
a subcarrier spacing used for calculating the time interval.

* * * * *